(12) United States Patent
Lotya

(10) Patent No.: US 11,645,487 B2
(45) Date of Patent: May 9, 2023

(54) METAL-CONTAINING DUAL INTERFACE SMARTCARDS

(71) Applicants: AmaTech Group Limited, Spiddal (IE); Federal Card Services, LLC, Cincinnati, OH (US)

(72) Inventor: Mustafa Lotya, Cellbridge (IE)

(73) Assignee: AmaTech Group Limited, County Galway (IE)

(*) Notice: Subject to any disclaimer, the term of this patent is extended or adjusted under 35 U.S.C. 154(b) by 0 days.

(21) Appl. No.: 17/544,603

(22) Filed: Dec. 7, 2021

(65) Prior Publication Data

US 2022/0237423 A1 Jul. 28, 2022

Related U.S. Application Data

(63) Continuation of application No. 16/993,295, filed on Aug. 14, 2020, which is a continuation-in-part of application No. 16/991,136, filed on Aug. 12, 2020, now Pat. No. 11,347,993.

(60) Provisional application No. 63/053,559, filed on Jul. 17, 2020, provisional application No. 63/040,544, filed on Jun. 18, 2020, provisional application No.
(Continued)

(51) Int. Cl.
*G06K 19/02* (2006.01)
*G06K 19/07* (2006.01)

(52) U.S. Cl.
CPC ......... *G06K 19/02* (2013.01); *G06K 19/0723* (2013.01)

(58) Field of Classification Search
None
See application file for complete search history.

(56) References Cited

U.S. PATENT DOCUMENTS 3,214,324 A * 10/1965 Peerman ............... C08J 5/249
156/283
5,413,814 A 5/1995 Bowen
(Continued)

FOREIGN PATENT DOCUMENTS

CN 205158409 U 4/2016
EP 2372840 B1 9/2013
(Continued)

OTHER PUBLICATIONS

PCT, Notification Concerning Transmittal of International Preliminary Report on Patentability, International Application No. PCT/US2020/046262, dated Feb. 24, 2022 (6 pages).
(Continued)

*Primary Examiner* — Kristy A Haupt
(74) *Attorney, Agent, or Firm* — McAndrews, Held & Malloy, Ltd.

(57) ABSTRACT

Smartcard (SC) having a metal card body (MCB) which is a coupling frame (CP) with a slit (S), and a coupling loop antenna/structure (CLA, CLS) connected to termination points (TP) on each side of the slit (S) and coupled with the module antenna (MA) of a transponder chip module (TCM). A portion of the card body (CB) may be metal and another, coplanar portion of the card body may be a synthetic material which may be transparent or translucent. Currents may be collected from the interface between the two portions. The card body (CB) may have two metal layers of different materials, adhesively joined to each other using a thermosetting epoxy that converts from B-stage to C-stage during lamination.

1 Claim, 20 Drawing Sheets

Related U.S. Application Data

63/040,033, filed on Jun. 17, 2020, provisional application No. 63/035,670, filed on Jun. 5, 2020, provisional application No. 63/034,965, filed on Jun. 4, 2020, provisional application No. 63/031,571, filed on May 29, 2020, provisional application No. 63/014,142, filed on Apr. 23, 2020, provisional application No. 62/986,612, filed on Mar. 6, 2020, provisional application No. 62/981,040, filed on Feb. 25, 2020, provisional application No. 62/979,422, filed on Feb. 21, 2020, provisional application No. 62/978,826, filed on Feb. 20, 2020, provisional application No. 62/971,927, filed on Feb. 8, 2020, provisional application No. 62/969,034, filed on Feb. 1, 2020, provisional application No. 62/960,178, filed on Jan. 13, 2020, provisional application No. 62/936,519, filed on Nov. 17, 2019, provisional application No. 62/912,701, filed on Oct. 9, 2019, provisional application No. 62/894,976, filed on Sep. 3, 2019, provisional application No. 62/891,433, filed on Aug. 26, 2019, provisional application No. 62/891,308, filed on Aug. 24, 2019, provisional application No. 62/889,555, filed on Aug. 20, 2019, provisional application No. 62/889,055, filed on Aug. 20, 2019, provisional application No. 62/888,539, filed on Aug. 18, 2019, provisional application No. 62/887,696, filed on Aug. 16, 2019, provisional application No. 62/886,978, filed on Aug. 15, 2019, provisional application No. 62/886,370, filed on Aug. 14, 2019.

(56) References Cited

U.S. PATENT DOCUMENTS

| | | | |
|---|---|---|---|
| 6,019,268 A | 2/2000 | Melzer |
| 6,139,664 A | 10/2000 | Melzer |
| D436,620 S | 1/2001 | Webb |
| D438,562 S | 3/2001 | Webb |
| D438,563 S | 3/2001 | Webb |
| 6,214,155 B1 | 4/2001 | Leighton |
| D442,222 S | 5/2001 | Webb |
| D442,627 S | 5/2001 | Webb |
| D442,628 S | 5/2001 | Webb |
| D442,629 S | 5/2001 | Webb |
| D443,298 S | 6/2001 | Webb |
| D447,515 S | 9/2001 | Faenza, Jr. |
| D449,336 S | 10/2001 | Webb |
| 6,378,774 B1 | 4/2002 | Emori |
| 6,452,563 B1 | 9/2002 | Porte |
| 6,491,229 B1 | 12/2002 | Berney |
| 6,581,839 B1 | 6/2003 | Lasch |
| 6,656,541 B1 | 12/2003 | Archer |
| 6,669,813 B1 | 12/2003 | Melzer |
| 6,749,123 B2 | 6/2004 | Lasch |
| 6,764,014 B2 | 7/2004 | Lasch |
| 6,843,422 B2 | 1/2005 | Jones |
| D507,298 S | 7/2005 | Allard |
| D507,598 S | 7/2005 | Allard |
| D508,261 S | 8/2005 | Allard |
| D510,103 S | 9/2005 | Allard |
| D512,095 S | 11/2005 | Allard |
| D523,471 S | 6/2006 | Allard |
| D525,298 S | 7/2006 | Allard |
| D525,653 S | 7/2006 | Allard |
| D525,654 S | 7/2006 | Allard |
| D526,013 S | 8/2006 | Allard |
| D526,014 S | 8/2006 | Allard |
| D526,015 S | 8/2006 | Allard |
| D526,016 S | 8/2006 | Allard |
| D527,421 S | 8/2006 | Allard |
| D529,955 S | 10/2006 | Allard |
| 7,207,494 B2 | 4/2007 | Fheodossiou |
| 7,278,580 B2 | 10/2007 | Jones |
| 7,287,704 B2 | 10/2007 | Herslow |
| 7,306,158 B2 | 12/2007 | Berardi |
| 7,306,163 B2 | 12/2007 | Scholz |
| D569,423 S | 5/2008 | Lasch |
| 7,377,443 B2 | 5/2008 | Lasch |
| 7,381,355 B2 | 6/2008 | Rawlins |
| D572,305 S | 7/2008 | Lasch |
| D578,569 S | 10/2008 | Lasch |
| D579,044 S | 10/2008 | Lasch |
| 7,494,057 B2 | 2/2009 | Lasch |
| 7,530,491 B2 | 5/2009 | Lasch |
| D593,600 S | 6/2009 | Lasch |
| 7,544,266 B2 | 6/2009 | Herring |
| 7,607,583 B2 | 10/2009 | Berardi |
| 7,819,310 B2 | 10/2010 | Lasch |
| 7,823,777 B2 | 11/2010 | Varga |
| 7,837,116 B2 | 11/2010 | Morrill Webb |
| 7,971,786 B2 | 7/2011 | Lasch |
| 8,033,457 B2 | 10/2011 | Varga |
| 8,066,190 B2 | 11/2011 | Faenza, Jr. |
| 8,079,514 B2 | 12/2011 | Lasch |
| 8,100,337 B2 | 1/2012 | Artigue |
| 8,186,582 B2 | 5/2012 | Varga |
| 8,186,598 B2 | 5/2012 | Faenza, Jr. |
| 8,393,547 B2 | 3/2013 | Kiekhaefer |
| 8,448,872 B2 | 5/2013 | Droz |
| 8,490,872 B2 | 7/2013 | Kim |
| 8,523,062 B2 | 9/2013 | Varga |
| 8,608,082 B2 | 12/2013 | Le Garrec |
| 8,672,232 B2 | 3/2014 | Herslow |
| 8,702,328 B2 | 4/2014 | Cronin |
| 8,737,915 B2 | 5/2014 | Beenken |
| 8,777,116 B2 | 6/2014 | Lin |
| 8,931,691 B2 | 1/2015 | Manessis |
| 8,976,075 B2 | 3/2015 | Kato |
| 9,024,763 B2 | 5/2015 | Hamedani |
| 9,033,250 B2 | 5/2015 | Finn |
| 9,203,157 B2 | 12/2015 | Kato |
| 9,269,032 B2 | 2/2016 | Zlotnik |
| 9,299,020 B2 | 3/2016 | Zimmermann |
| D756,317 S | 5/2016 | Finn |
| 9,390,360 B1 | 7/2016 | Yang |
| 9,390,363 B1 | 7/2016 | Herslow |
| 9,390,364 B2 | 7/2016 | Finn |
| 9,390,366 B1 | 7/2016 | Herslow |
| 9,475,086 B2 | 10/2016 | Finn |
| 9,489,613 B2 | 11/2016 | Finn |
| 9,542,635 B2 | 1/2017 | Herslow |
| 9,564,678 B2 | 2/2017 | Kato |
| 9,622,359 B2 | 4/2017 | Finn |
| 9,634,391 B2 | 4/2017 | Finn |
| 9,697,459 B2 | 7/2017 | Finn |
| 9,721,200 B2 | 8/2017 | Herslow |
| 9,727,370 B2 | 8/2017 | Greiner et al. |
| 9,727,759 B1 | 8/2017 | Essebag |
| 9,760,816 B1 | 9/2017 | Williams |
| 9,798,968 B2 | 10/2017 | Finn |
| 9,812,782 B2 | 11/2017 | Finn |
| 9,836,684 B2 | 12/2017 | Finn |
| 9,836,687 B1 | 12/2017 | Williams |
| 9,892,405 B2 | 2/2018 | Olson |
| 9,898,699 B2 | 2/2018 | Herslow |
| 9,960,476 B2 | 5/2018 | Finn |
| 10,032,169 B2 | 7/2018 | Essebag |
| 10,089,570 B2 | 10/2018 | Herslow |
| 10,140,569 B2 | 11/2018 | Kim |
| 10,160,247 B2 | 12/2018 | Beech |
| 10,193,211 B2 | 1/2019 | Finn |
| 10,248,902 B1 | 4/2019 | Finn |
| 10,262,258 B2 | 4/2019 | Beech |
| 10,275,703 B2 | 4/2019 | Herslow |
| 10,289,944 B2 | 5/2019 | Herslow |
| 10,311,346 B2 | 6/2019 | Herslow |
| 10,318,859 B2 | 6/2019 | Lowe |
| 10,325,135 B2 | 6/2019 | Andersen |
| 10,332,846 B2 | 6/2019 | Herslow |
| 10,373,920 B2 | 8/2019 | Herslow |
| 10,395,153 B2 | 8/2019 | Herslow |

(56) References Cited

U.S. PATENT DOCUMENTS

| | | |
|---|---|---|
| 10,395,164 B2 | 8/2019 | Lundberg |
| 10,406,734 B2 | 9/2019 | Lowe |
| 10,445,636 B2 | 10/2019 | Virostek |
| 10,507,677 B2 | 12/2019 | Wooldridge |
| 10,518,518 B2 | 12/2019 | Finn |
| 10,534,990 B2 | 1/2020 | Herslow |
| 10,583,594 B2 | 3/2020 | Lowe |
| 10,583,683 B1 | 3/2020 | Ridenour |
| 10,599,972 B2 | 3/2020 | Finn |
| 10,552,722 B2 | 10/2020 | Finn |
| 2005/0003297 A1 | 1/2005 | Labrec |
| 2005/0040243 A1 | 2/2005 | Daoshen |
| 2005/0095408 A1 | 5/2005 | Labrec |
| 2011/0181486 A1 | 7/2011 | Kato |
| 2012/0112971 A1 | 5/2012 | Takeyama |
| 2013/0126622 A1 | 5/2013 | Finn |
| 2014/0091149 A1 | 4/2014 | Finn |
| 2014/0231503 A1 | 8/2014 | Kunitaka |
| 2014/0279555 A1 | 9/2014 | Guillaud |
| 2014/0284386 A1 | 9/2014 | Finn |
| 2015/0021403 A1 | 1/2015 | Finn |
| 2015/0129665 A1 | 5/2015 | Finn |
| 2015/0206047 A1 | 7/2015 | Herslow |
| 2015/0269477 A1 | 9/2015 | Finn |
| 2016/0110639 A1 | 4/2016 | Finn |
| 2016/0148194 A1 | 5/2016 | Guillad |
| 2016/0257019 A1 | 9/2016 | Melzer |
| 2018/0005064 A1 | 1/2018 | Vogel |
| 2018/0341846 A1 | 3/2018 | Finn |
| 2018/0339503 A1* | 11/2018 | Finn ................ G06K 19/07722 |
| 2018/0341847 A1 | 11/2018 | Finn |
| 2018/0349751 A1 | 12/2018 | Herslow |
| 2019/0050706 A1 | 2/2019 | Lowe |
| 2019/0073578 A1 | 3/2019 | Lowe |
| 2019/0102662 A1 | 4/2019 | Snell |
| 2019/0114526 A1 | 4/2019 | Finn |
| 2019/0156073 A1 | 5/2019 | Finn |
| 2019/0156944 A1 | 5/2019 | Cox |
| 2019/0160717 A1 | 5/2019 | Lowe |
| 2019/0171923 A1 | 6/2019 | Finn |
| 2019/0197386 A1 | 6/2019 | Finn |
| 2019/0236434 A1 | 8/2019 | Lowe |
| 2019/0251322 A1 | 8/2019 | Slogedal |
| 2019/0251411 A1 | 8/2019 | Gire |
| 2019/0286961 A1 | 9/2019 | Lowe |
| 2019/0291316 A1 | 9/2019 | Lowe |
| 2019/0311235 A1 | 10/2019 | Sexl |
| 2019/0311236 A1 | 10/2019 | Sexl |
| 2019/0332907 A1 | 10/2019 | Herslow |
| 2019/0384261 A1 | 12/2019 | Nam |
| 2020/0034578 A1 | 1/2020 | Finn |
| 2020/0151534 A1 | 5/2020 | Lotya |
| 2020/0164675 A1 | 5/2020 | Ridenour |

FOREIGN PATENT DOCUMENTS

| | | |
|---|---|---|
| KR | 10-1754985 B1 | 6/2017 |
| WO | 2017/090891 A1 | 6/2017 |
| WO | 2017/198842 A1 | 11/2017 |
| WO | 2019/173455 A1 | 9/2019 |

OTHER PUBLICATIONS

PCT, International Search Report and Written Opinion for PCT/US20/46262, dated Feb. 3, 2021 (8 pages).

Chen, S.L., et al., A Metallic RFID Tag Design for Steel-Bar and Wire-Rod Management Application in the Steel Industry, Progress in Electromagnetics Research, PIER 91, pp. 195-212, 2009 (18 pages).

T900306, Cast Modified Epoxy Adhesive, GTS Flexible Materials, Feb. 13, 2019 (2 pages).

DEVT-08-20, Epoxy Adhesive Pen Tapes, GTS Flexible Materials, Jan. 9, 2020 (2 pages).

* cited by examiner

P1 Opening for Module Tape
P2 Opening for Mold Mass

METAL-CONTAINING DUAL INTERFACE SMARTCARDS

CROSS-REFERENCES TO RELATED APPLICATIONS

Priority (filing date benefit) is claimed from the following, incorporated by reference herein:

This application is a continuation of U.S. Ser. No. 16/993, 295 filed 14 Aug. 2020, which is a continuation-in-part of U.S. Ser. No. 16/991, 136 filed 12 Aug. 2020.

This application is:
a nonprovisional of 63/053,559 filed 17 Jul. 2020
a nonprovisional of 63/040,544 filed 18 Jun. 2020
a nonprovisional of 63/040,033 filed 17 Jun. 2020
a nonprovisional of 63/035,670 filed 5 Jun. 2020
a nonprovisional of 63/034,965 filed 4 Jun. 2020
a nonprovisional of 63/031,571 filed 29 May 2020
a nonprovisional of 63/014,142 filed 23 Apr. 2020
a nonprovisional of 62/986,612 filed 6 Mar. 2020
a nonprovisional of 62/981,040 filed 25 Feb. 2020
a nonprovisional of 62/979,422 filed 21 Feb. 2020
a nonprovisional of 62/978,826 filed 20 Feb. 2020
a nonprovisional of 62/971,927 filed 8 Feb. 2020
a nonprovisional of 62/969,034 filed 1 Feb. 2020
a nonprovisional of 62/960,178 filed 13 Jan. 2020
a nonprovisional of 62/936,519 filed 17 Nov. 2019
a nonprovisional of 62/912,701 filed 9 Oct. 2019
a nonprovisional of 62/894,976 filed 3 Sep. 2019
a nonprovisional of 62/891,433 filed 26 Aug. 2019
a nonprovisional of 62/891,308 filed 24 Aug. 2019
a nonprovisional of 62/889,555 filed 20 Aug. 2019
a nonprovisional of 62/889,055 filed 20 Aug. 2019
a nonprovisional of 62/888,539 filed 18 Aug. 2019
a nonprovisional of 62/887,696 filed 16 Aug. 2019
a nonprovisional of 62/886,978 filed 15 Aug. 2019
a nonprovisional of 62/886,370 filed 14 Aug. 2019

TECHNICAL FIELD

This disclosure relates to RFID-enabled (or "contactless" capable) smartcards ("cards"), such as metal transaction cards and, more particularly, to biometric transaction cards and/or smartcards with a display.

The disclosure may relate broadly to passive RFID-enabled metal containing transaction cards including "metal smartcards" such as encapsulated metal smartcards (aka encased metal cards), metal core smartcards (aka embedded metal or metal veneer smartcards—plastic front, edge to edge metal core, plastic back), metal face smartcards (aka metal hybrid cards—metal front, plastic back), full metal smartcards, and biometric metal smartcards, having an RFID chip (IC) capable of operating in a "contactless" mode (ISO 14443 or NFC/ISO 15693), including dual interface (DI) metal smartcards and metal payment objects (or "metal payment devices") which can also operate in "contact" mode (ISO 7816-2). Some of the disclosure(s) herein may relate to metal smartcards having only a contactless interface.

This disclosure may also relate to Inductive Coupling between an Inductive Coupling Chip Module (ICM), Transponder Chip Module (TCM), Coil on Module (CoM), Coil on Chip (CoC) or an RFID chip connected to an antenna (e.g. in general a Tag, Transponder, Transponder Chip Module), and a Coupling Frame (CF) or a Stack of Coupling Frames (SCFs) when in the presence of an electromagnetic field generated by a contactless reader or terminal, with the antenna structure (AS) (or module antenna (MA)) of the transponder device or transponder chip module adjacent or overlapping a slit or slits (or discontinuities) provided in the Coupling Frame (CF) or a Stack of Coupling Frames (SCFs). The Coupling Frame(s) may be made of a solid metal structure, a metal foil, or a conductive layer which is not electromagnetically transparent. The slit or a combination of slits which overlap the antenna structure (AS) of the transponder device may concentrate surface eddy (Foucault) current density in the area of the slit, to provide power delivery to a RFID chip or an another component.

The disclosure(s) herein may further relate to biometric transaction cards and smartcards with a dynamic display.

Some of the disclosure(s) herein may relate to RFID-enabled metal transaction cards having only a contact interface, or having only a contactless interface, or having dual interface (DI; contact and contactless).

BACKGROUND

Metal containing dual interface smartcards comprise of a least one metal layer (ML) with a slit (S) and a module opening (MO) to act as a coupling frame (CF), concentrating surface eddy current density around the slit (S) and module opening (MO), when in the presence of an electromagnetic field generated by a contactless reader or point of sale (POS) terminal. The surface currents around the slit (S) and module opening (MO) power the transponder chip module (TCM) by the principle of inductive coupling.

The slit (S) and module opening (MO) mechanically destabilize the metal layer (ML), and unless the metal layer (ML) is sandwiched between bonding and synthetic layers, the metal containing smartcard can easily bend around the area of the slit (S) when subjected to flexing or torsion.

To overcome the destabilization in the mechanical robustness of the smartcard, two metal layers are used in the stack-up construction of the card. Each metal layer (ML) has a slit (S) emerging from a different or opposite direction from the module opening (MO) and extending to a perimeter edge of the card body (CB). The two metal layers are adhesively attached to each other using a double-sided coated dielectric film. The dielectric film acting as a carrier layer for the adhesive layers has the function of electrically separating the metal layers.

Although the mechanical stability is achieved, the choice of adhesive and dielectric have an impact on the drop acoustics of the metal containing smartcard. Both substrates also influence the ageing of the end mill and chamfer tools used to singulate and finish metal containing smartcards from a laminated array of card bodies, generally referred to as an inlay.

Therefore, it is a general object of the current invention to provide techniques for improving (i) coupling of an RFID-enabled metal containing smartcard with a contactless reader; (ii) mechanical stability of the transaction card; (iii) the drop acoustics of the metal transaction card to retain the metal sound integrity; and the integration of electronic components therein.

It is a further object to maximize the power delivery to the RFID chip or any additional component integrated into the card body, by picking up surface currents from different locations in a card body.

Some Definitions

Some of the following terms may be used or referred to, herein. Some may relate to background or general knowledge, others may relate to the invention(s) disclosed herein.

Eddy Currents

Eddy currents are induced electrical currents that flow in a circular path. In other words, they are closed loops of induced current circulating in planes perpendicular to the magnetic flux. Eddy currents concentrate near the surface adjacent to the excitation coil of the contactless reader generating the electromagnetic field, and their strength decreases with distance from the transmitter coil. Eddy current density decreases exponentially with depth. This phenomenon is known as the skin effect. The depth that eddy currents penetrate into a metal object is affected by the frequency of the excitation current and the electrical conductivity and magnetic permeability of the metal.

Skin Depth

Skin effect is the tendency of an alternating electric current (AC) to become distributed within a conductor such that the current density is largest near the surface of the conductor, and decreases with greater depths in the conductor. The electric current flows mainly at the "skin" of the conductor, between the outer surface and a level called the skin depth. The skin effect causes the effective resistance of the conductor to increase at higher frequencies where the skin depth is smaller, thus reducing the effective cross-section of the conductor. The skin effect is due to opposing eddy currents induced by the changing magnetic field resulting from the alternating current.

Eddy Currents and a Slit in a Metal Layer or Metal Card Body

A discontinuity interrupts or alters the amplitude and pattern of the eddy currents which result from the induced electromagnetic field generated by a contactless point of sale terminal. The eddy current density is highest near the surface of the metal layer (ML) and decreases exponentially with depth.

RFID Slit Technology

Providing a metal layer in a stack-up of a card body, or an entire metal card body, to have a module opening for receiving a transponder chip module (TCM) and a slit (S) to improve contactless (RF) interface with the card—in other words, a "coupling frame"—may be described in greater detail in U.S. Pat. Nos. 9,475,086, 9,798,968, and in some other patents that may be mentioned herein. In some cases, a coupling frame may be formed from a metal layer or metal card body having a slit, without having a module opening. A typical slit may have a width of approximately 100 µm. As may be used herein, a "micro-slit" refers to a slit having a smaller width, such as approximately 50 µm, or less.

"RFID Slit Technology" refers to modifying a metal layer (ML) or a metal card body (MCB) into a so-called "antenna circuit" by providing a discontinuity in the form of a slit, slot or gap in the metal layer (ML) or metal card body (MCB) which extends from a peripheral edge to an inner area or opening of the layer or card body. The concentration of surface current at the inner area or opening can be picked up by another antenna (such as a module antenna) or antenna circuit by means of inductive coupling which can drive an electronic circuit such as an RFID chip attached directly or indirectly thereto. The slit may be ultra-fine (typically less than 50 µm or less than 100 µm), cut entirely through the metal with a UV laser, with the debris from the plume removed by ultrasonic or plasma cleaning. Without a cleaning step after lasing, the contamination may lead to shorting across the slit. In addition, the slit may be filled with a dielectric to avoid such shorting during flexing of the metal forming the transaction card. The laser-cut slit may be further reinforced with the same filler such as a resin, epoxy, mold material, repair liquid or sealant applied and allowed to cure to a hardened state or flexible state. The filler may be dispensed or injection molded. The term "slit technology" may also refer to a "coupling frame" with the aforementioned slit, or to a smartcard embodying the slit technology or having a coupling frame incorporated therein.

Module Antenna (MA)

This is an antenna structure (AS) located on the face-down-side of a transponder chip module (TCM) or dual interface chip module (DI chip module) for inductive coupling with an in-card booster antenna (BA) or coupling frame (CF). The antenna structure (AS) is usually rectangular in shape with dimensions confined to the size of the module package having 6 or 8 contact pads on the face-up-side. The termination ends of the antenna structure (AS) with multiple windings (13 to 15 turns) based on a frequency of interest (e.g. 13.56 MHz) are bonded to the connection pads ($L_A$ and $L_B$) on the RFID chip. In the case of a coupling frame (CF) smartcard such as a dual interface metal core transaction card, the module antenna (MA) overlaps the coupling frame or metal layer(s) within the card body at the area of the module opening to accept the transponder chip module (TCM).

Coupling Loop Antenna (CLA)

This is antenna structure (AS) which couples to a module antenna (MA) in a transponder chip module (TCM). The windings or traces of the coupling loop antenna (CLA) may intertwine those windings of the module antenna (MA), or the windings or traces of the coupling loop antenna (CLA) may couple closely with the windings of the module antenna (MA) similar in function to a primary and secondary coil of a transformer. The termination ends of a coupling loop antenna (CLA) may be connected to termination points (TPs) across a discontinuity in a metal layer (ML) or metal card body (MCB) acting as a coupling frame (CF).

Coupling Frame Antenna (CFA)

A metal layer or metal card body with a discontinuity may be represented by card size planar antenna having a single turn, with the width of the antenna track significantly greater than the skin depth at the frequency of interest.

Sense Coil (SeC), Patch Antenna (PA) and Pick-Up Coil (PuC)

These are all types of coils or antennas used to capture surface current by means of inductive coupling at the edge of a metal layer (ML) or metal card body (MCB) or around a discontinuity in a metal layer (ML) or metal card body (MCB) when such conductive surfaces are exposed to an electromagnetic field. The coils or antennas may be wire wound, chemically etched or laser etched, and positioned at very close proximity to a discontinuity in a metal layer, at the interface between a conductive and non-conductive surface, or at the edge of a metal layer.

Antenna Cell (AC)

It is an antenna structure (AS) such as sense coil (SeC), patch antenna (PA) or pick-up coil (PuC) on a flexible circuit (FC) driving an electronic component such as a fingerprint sensor or a dynamic display. A plurality of antenna cells (ACs) at different locations in a metal transaction card may be used to power several electronic components.

Antenna Probe (AP)

A pick-up antenna in the form of a micro-metal strip (first electrode) may be placed in the middle of a discontinuity to probe eddy current signals from the magnetic flux interaction with the metal layer acting as the coupling frame. The metal layer also acts as the second electrode in the circuit. The metal strip may be replaced by a sense coil with a very fine antenna structure to pick-up the surface currents from within the discontinuity.

Coupling Loop Structure (CLS)

A coupling loop structure (CLS), or simply coupling structure (CS), is a flexible circuit (FC) with a sense Coil (SeC), patch antenna (PA) or pick-up coil (PuC) for inductive coupling with a discontinuity in a metal layer (coupling frame) to pick-up surface currents and to direct such currents via traces or tracks to an antenna having a frame or spiral shape on the flexible circuit (FC) which further inductively couples in close proximity with the module antenna (MA) of a transponder chip module (TCM).

Metal Edge & Metal Ledge

For optimum RF performance the dimensional width of the windings (or width across multiple windings) of a sense coil (SeC), patch antenna (PA) or a pick-up coil (PuC) ought to overlap a metal edge (ME) by 50% to capture the surface currents. The same applies to the module antenna (MA) of a transponder chip module (TCM) implanted in a metal containing transaction card. The dimensional width of the windings of the module antenna (MA) ought to overlap a metal ledge (P1) of a stepped cavity forming the module pocket in a card body by 50%. In the case of an antenna probe, surface currents are collected between very close metal edges. As the shape and form of the antennas may change, the dimensional width of the windings may be replaced by the surface area or volume.

Polyethylene Naphthalate (PEN)

It is a high-performance, crystal clear thermoplastic made from naphthalene-2,6-dicarboxylic acid and ethylene glycol. PEN has many attractive properties including high tensile strength, low heat shrinkage, excellent dimensional stability, low moisture absorption, and good retention of physical properties over a fairly wide temperature range. Its oxygen barrier, hydrolytic stability, and tensile strength surpass those of PET films. It also has superior UV resistance, excellent electrical properties, much lower heat shrinkage, good optical clarity and high gloss but only moderate moisture barrier properties. It has a relative high melting point and glass transition temperature (120° C.), which makes it suitable for applications that require sterilization at high temperatures. Typical grades have a continuous service temperature of about 160° C.

Thermosetting Resin

A thermosetting resin, or thermoset, is a polymer which cures or sets into a hard shape using curing method such as heat or radiation. The curing process is irreversible as it introduces a polymer network crosslinked by covalent chemical bonds.

Upon heating, unlike thermoplastics, thermosets remain solid until temperature reaches the point where thermoset begins to degrade.

Phenolic resins, amino resins, polyester resins, silicone resins, epoxy resins, and polyurethanes (polyesters, vinyl esters, epoxies, bismaleimides, cyanate esters, polyimides and phenolics) are few examples of thermosetting resins.

Thermoset Adhesives

Thermoset adhesives are crosslinked polymeric resins that are cured using heat and/or heat and pressure. They represent a number of different substances that undergo a chemical reaction when curing, such that the structure formed has superior strength and environmental resistance. Despite their name, thermosets may or may not require heat to cure and may instead use irradiation or electron beam processing. Due to their superior strength and resistance, thermosets are widely used for structural load-bearing applications.

Thermoset adhesives are available as one- or (more commonly) two-component systems. One component systems use heat curing and require cold storage for sufficient shelf life. Most one component adhesives are sold as pastes and applied by a trowel to easily fill gaps.

Two component systems must be mixed and applied within a set time frame, ranging from a few minutes to hours. Two component epoxies are suitable for bonding nearly all substrates and feature high strength and chemical resistance as well as excellent long-term stability.

B-Staged Epoxy Resin

This is a descriptive term used to define a one component epoxy system, using a latent (low reactivity) curing agent. This unique product can be partially cured (sometimes referred to as "pre-dried"), as an initial stage after being applied onto one substrate/surface. It can, at a later time, be completely cured under heat and pressure.

Partially cured epoxy, or B-staged epoxy adhesive, does have processing advantages. The adhesive can have its initial application and partial cure in one location, and its final cure in another location weeks later.

C-Staged Epoxy Resin

The B stage is a solid, thermoplastic stage. When given additional heat, the B-stage epoxy will flow and continue to cure to a crosslinked condition or C stage.

SOME PATENTS AND PUBLICATIONS

The following patents and/or publications ("references") may be of interest or relevant to the invention(s) disclosed herein, and some commentary may be provided to distinguish the invention(s) disclosed herein from the following references.

U.S. Pat. No. 10,552,722 Smartcard with coupling frame antenna
U.S. Pat. No. 10,248,902 Coupling frames for RFID devices
U.S. Pat. No. 10,193,211 Smartcards, RFID devices, wearables and methods
U.S. Pat. No. 9,960,476 Smartcard constructions
U.S. Pat. No. 9,836,684 Smartcards, payment objects and methods
U.S. Pat. No. 9,697,459 Passive smartcards, metal cards, payment objects
U.S. Pat. No. 9,812,782 Coupling frames for RFID devices
U.S. Pat. No. 9,390,364 Transponder chip module with coupling frame on a common substrate
U.S. Pat. No. 9,489,613 RFID transponder chip modules with a band of the antenna extending inward
U.S. Pat. No. 9,634,391 RFID transponder chip modules
U.S. Pat. No. 9,622,359 RFID transponder chip modules
U.S. Pat. No. 9,798,968 Smartcard with coupling frame and method of increasing activation distance
U.S. Pat. No. 9,475,086 Smartcard with coupling frame and method of increasing activation distance
2018/0339503 Smartcards with metal layers and methods of manufacture
2018/0341846 Contactless metal card construction
2019/0114526 Smartcard constructions and methods
2019/0171923 Metallized smartcard constructions and methods
2019/0197386 Contactless smartcards with multiple coupling frames
2019/0392283 RFID transponder chip modules, elements thereof, and methods
2020/0005114 Dual interface metal hybrid smartcard
2020/0034578 Smartcard with display and energy harvesting
2020/0050914 Connection bridges for dual interface transponder chip modules
2020/0151534 Smartcards with metal layers and methods of manufacture

SOME ADDITIONAL REFERENCES

U.S. Pat. No. 6,452,563 (17 Sep. 2002; Gemplus aka Gemalto; Porte)
U.S. Pat. No. 6,491,229 (10 Dec. 2002; NJC Innovations; Berney)
U.S. Pat. No. 7,306,163 (11 Dec. 2007; IBM; Scholz et al.)
U.S. Pat. No. 8,186,582 (29 May 2012; American Express; Varga et al.)
U.S. Pat. No. 8,523,062 (2013 Sep. 3; Varga et al.)
U.S. Pat. No. 8,393,547 (12 Mar. 2013; Perfect Plastic Printing; Kiekhaefer et al.)
U.S. Pat. No. 8,608,082 (17 Dec. 2013; La Garrec et al.; Oberthur Technologies, aka IDEMIA)
U.S. Pat. No. 8,737,915 (27 May 2014; J. H. Tonnjes E. A. S. T.; Beenken)
U.S. Pat. No. 9,024,763 (5 May 2015; Hamedani Soheil)
U.S. Pat. No. 9,299,020 (29 Mar. 2016; TheCard; Zimmerman et al.)
U.S. Pat. No. 9,390,366 (12 Jul. 2016; CompoSecure; Herslow et al.)
U.S. Pat. No. 9,564,678 (7 Feb. 2017; Murata Manufacturing; Kato et al.) Reference is also made to U.S. Pat. Nos. 8,976,075 and 9,203,157.
U.S. Pat. No. 9,721,200 (1 Aug. 2017; CompoSecure; Herslow et al.)
U.S. Pat. No. 9,760,816 (12 Sep. 2017; American Express; Williams et al.)
U.S. Pat. No. 9,836,687 (2017 Dec. 5 Williams et al.; AMEX)
U.S. Pat. No. 9,898,699 (20 Feb. 2018; CompoSecure; Herslow et al.)
U.S. Pat. No. 10,140,569 (27 Nov. 2018; Kim et al.)
U.S. Pat. No. 10,089,570 (2 Oct. 2018; CompoSecure; Herslow et al.)
U.S. Pat. No. 10,275,703 (30 Apr. 2019; CompoSecure; Herslow et al.)
U.S. Pat. No. 10,289,944 (14 May 2019; CompoSecure; Herslow et al.)
U.S. Pat. No. 10,318,859 (11 Jun. 2019; CompoSecure; Lowe, et al.)
U.S. Pat. No. 10,445,636 (15 Oct. 2019; Giesecke & Devrient; Virostek et al.)
U.S. Pat. No. 10,534,990 (14 Jan. 2020; CompoSecure; Herslow et al.)
U.S. Pat. No. 10,583,683 (10 Mar. 2020; Federal Card Services; Ridenour et al.)
US 2020/0164675 (2020 Jul. 28 Ridenour et al.; FCS)
US 2011/0181486 (28 Jul. 2011; Kato; Murata)
US 2012/0112971 (10 May 2012; Takeyama et al.; Panasonic)
US 2013/0126622 (23 May 2013; Finn)
US 2015/0206047 (23 Jul. 2015; CompoSecure; Herslow)
US 2019/0050706 (14 Feb. 2019; CompoSecure; Lowe) now U.S. Pat. No. 10,406,734
US 2019/0073578 (7 Mar. 2019; CompoSecure; Lowe et al.)
US 2019/0160717 (2019 May 30; Lowe; CompoSecure)
US 2019/0286961 (2019 Sep. 19; Lowe; CompoSecure)
US 2019/0291316 (now U.S. Pat. No. 10,583,594).
US 2019/0156994 (23 May 2019; X-Card Holdings; Cox)
US 2019/0236434 (1 Aug. 2019; CompoSecure; Lowe)
US 2014/0231503 (21 Aug. 2014; Smart Co.; Kunitaka)
US 2019/0311235 (10 Oct. 2019; Giesecke & Devrient; Sexl et al.)
US 2019/0311236 (10 Oct. 2019; Giesecke & Devrient; Sexl et al.)
US 2019/0384261 (19 Dec. 2019; Kona I; Nam et al.)
Chen, S. L., Kuo, S. K. and Lin C. T. (2009) incorporated by reference herein, discloses "A metallic RFID tag design for steel-bar and wire-rod management application in the steel industry" (Progress in Electromagnetics Research, PIER Vol. 91: pp. 195-212.)
EP 2372840 (25 Sep. 2013; Hashimoto; Panasonic)
CN 205158409U (13 Apr. 2016)
WO 2017/090891 (1 Jun. 2017; Biosmart; Yoon et al.)
KR 10-1754985 (30 Jun. 2017; Aichi CK Corporation aka ICK; Kim et al.)
PCT/US2019/020919 (12 Sep. 2019; X-Card Holding; Cox)

SOME FURTHER REFERENCES

The following references may also be applicable to the invention(s) disclosed herein:
U.S. Pat. Nos. 6,581,839, 6,749,123, 6,764,014, 7,306,158, 7,377,443, 7,607,583, 7,837,116, 8,066,190, 8,186,598, 7,494,057, 7,530,491, 7,819,310, 7,823,777, 7,971,786, 8,033,457, 8,079,514, 8,186,582, 8,523,062, 9,760,816, 9,836,687 D436,620, D438,562, D438,563, D 442,222, D442,627, D442,628, D442,629, D443,298, D447,515, D449,336, D507,298, D507,598, D508,261 D510,103, D512,095, D523,471, D525,298, D525,653, D525,654, D526,013, D526,014, D526,015, D526,016, D527,421 and D529,955, D569,423, D572,305, D578,569, D579, 044 and D593,600.

SUMMARY

The invention may relate to innovations in or improvements to RFID-enabled ("contactless capable) metal smartcards or metal transaction cards having two metal layers (both modified to function as coupling frames, and to an appropriate adhesive medium disposed between the two metal layers.

According to the invention, generally, a smartcard (SC) may have a metal card body (MCB) which is a coupling frame (CF) with a slit (S), and a coupling loop antenna (CLA) or coupling loop structure (CLS) connected to termination points (TP) on each side of the slit (S) and coupled with the module antenna (MA) of a transponder chip module (TCM). A portion of the card body (CB) may be metal and another, coplanar portion of the card body may be a synthetic material which may be transparent or translucent. Currents may be collected from the interface between the two portions. The card body (CB) may have two metal layers of different materials, adhesively joined to each other using a thermosetting epoxy that converts from B-stage to C-stage during lamination.

Smartcards having (i) a metal card body (MCB) with a slit (S) acting as a coupling frame (CF) having termination points (TP) on each side of the slit (S), (ii) a coupling loop antenna (CLA) or coupling loop structure (CLS) with two end portions tightly coupled to a module antenna (MA) connected to an RFID chip in a transponder chip module and (iii) the end portions of the coupling loop antenna (CLA) are electrically connected to the termination points (TP) on each side of the slit (S) of the coupling frame (CF).

In a metal-containing transparent smartcard (SC) where a portion of the card body (CB) is made of a synthetic material and the other portion of the card body on the same plane is made of metal, the surface currents can be collected at the interface (ideally at the ISO position for the transponder chip module (TCM)) between the insulation synthetic layer(s) and the conducting metal layer(s) having a slit (S) to provide for the discontinuity. The transponder chip module (TCM) can be embedded in the card body (CB) to overlap both the synthetic layer and metal layer.

In an alternate configuration, the surface currents can be collected at the interface between the non-conducting synthetic layer(s) and the conducting metal layer(s) (without having a discontinuity in the form of a slit or notch) at the ISO position for the transponder chip module (TCM).

To maintain the metal sound of a metal containing transaction card with two metal layers adhesively attached to each other, a dielectric carrier layer may be used with a special thermosetting adhesive system.

The adhesive system may be delivered as a partially cured epoxy or B-staged epoxy adhesive that converts to the C-stage during the lamination process by applying temperature and pressure. This C-stage state should be the final reaction stage of the thermosetting resin where the epoxy is mostly insoluble and infusible. The thermosetting resin and the choice of dielectric may have a beneficial impact on the drop acoustics of a metal transaction card and on the life of the milling tools used to produce metal card bodies.

Different metal layers may be used in a card construction having two metal layers, such as titanium and stainless steel. Other metals, such as brass may also be chosen.

According to some embodiments (examples) of the invention, a smartcard (SC) may comprise two metal layers adhesively attached to each other with thermosetting epoxy. The thermosetting epoxy may be applied in B-stage, and converts to C-stage after a lamination process involving temperature and pressure. The two metal layers may be separated by a dielectric carrier layer. The dielectric carrier layer may comprise a PET film, or a PEN film. The thermosetting epoxy may be applied to both (front and rear) sides of the dielectric carrier. At least one of the metal layers may have a slit (S) so that it may function as a coupling frame (CF).

According to some embodiments (examples) of the invention, a smartcard (SC) may comprise a card body (CB) having a metallic portion (510, 610, 710, 810, 910) and a non-metallic portion (520, 620, 720, 820, 920) exposed at a front surface of the card. The metallic and non-metallic portions may be coplanar with one another. The metallic and non-metallic portions may be supported by a common layer or layers of metallic or non-metallic material or by a rear plastic subassembly. The smartcard may further comprise a flexible circuit (FC) having a sense coil (SeC) overlapping the slit or metal edge.

The metallic (conductive) portion may have a slit (S; 518, 618, 818, 918) or a metal edge (ME, 718) at an interface with the non-metallic (non-conductive) portion so that it can function as a coupling frame (CF). The metallic (conductive) portion may have a metal edge (ME, 718) at an interface with the non-metallic (non-conductive) portion. The smartcard may further comprise a transponder chip module (TCM) with a module antenna (MA) overlapping the slit (S) or the metal edge (ME).

One or the other of the metallic and non-metallic portions of the card body extends over substantially the entire area of the card, and is provided with a recess or pocket to receive the other portion, resulting in a front surface of the metallic and non-metallic portions being coplanar with one another.

According to some embodiments (examples) of the invention, a transponder chip module (TCM) for a smartcard (SC) may comprise: a substrate (MT, CCT) having two surfaces; contact pads (CP) disposed in a contact pad array (CPA) on a first surface of the substrate; and at least one connection bridge (CBR) disposed on the first surface of the substrate for interconnecting component elements on a second surface of the substrate; wherein an insertion direction is defined for the transponder chip module; wherein the component elements may comprise: a coupling loop antenna (CLA); and a module antenna (MA, AS); and wherein the connection bridge or bridges facilitating the jump-overs between the antenna tracks of the coupling loop antenna (CLA) and the antenna tracks of the module antenna (MA, AS) connected to the RFID chip. The smartcard (SC) may comprise a coupling frame (CF) having a slit (S); and the coupling loop antenna (CLA) may be connected to the coupling frame (CF). The smartcard (SC) may comprise a coupling frame (CF) having a slit(S); a patch antenna (PA); and the coupling loop antenna (CLA) may be connected to the patch antenna (PA). The patch antenna may pick up surface currents in an area of the slit in the coupling frame. A capacitor may be connected in series or parallel with the coupling loop antenna.

It is a general object of the invention to provide improved techniques for implementing a coupling loop antenna (CLA) with a start and end contact pad (or end portions), an antenna structure (AS) or module antenna (MA) and connection bridges (CBR) in dual-interface inductive coupling chip modules (ICM) or transponder chip modules (TCM).

The coupling loop antenna (CLA) disclosed herein, with a start and end contact pad (connection taps) having at least one antenna turn, may be physically connected to opposing positions across a slit or discontinuity in a conductive surface such as a metal layer (ML) in the form of a smartcard body, aka a coupling frame (CF). The connection (galvanic) between the opposing points on a slit (including a slit extending from a perimeter edge of a metal card body to an opening to accept a transponder chip module) permits a direct conduction path from the coupling frame (CF) to the coupling loop antenna (CLA) (with at least one antenna turn) in the transponder chip module (TCM). When the coupling frame (CF) is exposed to an electromagnetic field, the surface eddy currents flow along its perimeter edge and into the slit or discontinuity, and by means of the connection taps the surface eddy current density concentrates around the area of the coupling loop antenna (CLA) formed on the front or rear face of a transponder chip module (TCM).

The antenna structure (AS) or module antenna (MA) disclosed herein may be a chemical or laser etched planar antenna (PA) having several windings which intertwine with the coupling loop antenna (CLA) to form a transformer circuit. The coupling loop antenna (CLA) may be adjacent to the windings of the antenna structure (AS). The coupling loop antenna (CLA) may overlap the windings of the antenna structure (AS). The antenna structure (AS) and or coupling loop antenna (CLA) may be stacked on multiple independent layers in a transponder chip module (TCM). The purpose of the coupling loop antenna (CLA) is to efficiently concentrate the surface eddy current density at close proximity to the antenna structure (AS) of the transponder chip module (TCM), to enhance read/write performance.

The combination of a coupling loop antenna (CLA) (having at least one antenna turn) with an antenna structure (AS) connected to the RFID chip is particularly advantageous for the small form factor of a 6 pad or pin DI chip module.

The conductivity of the coupling loop antenna (CLA) may be greater than the conductivity of the coupling frame (CF) with slit (S), providing a path of less electrical resistance for the flow of surface current to the area around the module antenna (MA) of the transponder chip module (TCM).

The coupling loop antenna (CLA) may be physically connected across one slit (S) in a coupling frame (CF), across several slits arranged in a coupling frame or between slits in a stack of coupling frames making up a card body.

The coupling loop antenna (CLA) may be connected to a sense coil or patch antenna which overlaps at least one slit (S) in a coupling frame (CF) and by means of induction powering the transponder chip module (TCM).

The connection bridges (CBR) disclosed herein may facilitate implementing features such as clock-wise and anti-clockwise windings, or interleaving between antenna tracks.

The number of turns or windings of the module antenna (MA, AS) is dependent on the electrical parameters of the RFID chip and the required system frequency (SF) of the smartcard, in general slightly above the ISM frequency of 13.56 MHz for contactless payment.

To regulate the system frequency (SF), a capacitor (C) may be connected across the coupling loop antenna (CLA), placed in series or parallel with the antenna structure (AS), or connected across the coupling loop antenna (CLA) and antenna structure (AS, MA).

Metal-containing dual interface smartcards (SC) having (i) a transparent or translucent layer (TL), and a metal layer (ML) with a slit (S) or notch (N) passing entirely through the metal layer (ML) and extending for a short distance across the metal layer (ML) to act as a coupling frame (CF); (ii) the metal layer (ML) with slit (S) or notch (N) made of non-magnetic stainless steel, titanium, gold, palladium, tungsten, aluminum or brass, providing weight and robustness to the card body (CB); (iii) the metal layer surface may be coated with a suitable medium to render it non-conductive to offset the effects of electrostatic discharge; (iv) the transparent or translucent layer (TL) made of a synthetic material may be laser engraved accompanied by the metal layer (ML), with both substrates etched with personalization data or graphic features; (v) the metal layer (ML) with slit (S) or notch (N) may be positioned in the center of the card body (CB), the metal layer (ML) may occupy a portion of the card body interfacing with the transparent layer (TL) which occupies the remaining portion of the card body (CB), or the metal layer (ML) covering the card body area (edge-to-edge) may be placed behind the transparent layer (TL); (vi) the metal layer may have a milled or chemical etched channel to accept a magnetic stripe, a signature panel, hologram or payment scheme logo; (vii) a module opening (MO) in the transparent or translucent layer (TL) and/or metal layer (ML) to accept a transponder chip module (TCM) having a module antenna (MA) connected to an RFID chip (IC); (viii) the module antenna (MA) of the transponder chip module (TCM) overlapping either an interface area between the transparent layer (TL) and the metal layer (ML) and/or a slit (S) or notch (N) in the metal layer (ML) and/or inductively coupling with a flexible circuit (FC) diverting surface eddy currents; and (ix) the slit may be reinforced with nylon and a plasticizer to strengthen the card body and to regulate the acoustic drop of the card on a hard surface.

Such cards may be contactless only, contact only, or may be dual-interface (contact and contactless) cards.

It is an object of the invention, in producing metal containing dual interface smartcards to laminate metal-to-metal and metal-to-plastic under temperature and pressure using an adhesive system that does not reactivate in a later process step when temperature is applied to the laminated structure. In CNC machining the laminated structure to extract individual card bodies, also referred to as singulation, it is imperative that the thermal influence from milling does not cause the adhesive to melt at the edges of the cut. If the adhesive is soft and tacky it will impair the cutting process and reduce the lifetime of the milling tools.

It is an object of the invention that the adhesive system is delivered as a partially cured epoxy or B-staged epoxy adhesive that converts to the C-stage during the lamination process by applying temperature and pressure. This C-stage state should be the final reaction stage of the thermosetting resin where the epoxy is mostly insoluble and infusible.

The dielectric layer may be constructed from a 25 µm Polyethylene Naphthalate (PEN) film coated on both sides with a 25 µm coating of an epoxy based thermosetting adhesive system.

Different metal layers with different acoustic properties may be used in the card construction, such as the combination of titanium and stainless steel.

In their various embodiments, the invention(s) described herein may relate to industrial and commercial industries, such RFID applications, payment smartcards (metal, plastic or a combination thereof), electronic credentials, identity cards, loyalty cards, access control cards, and the like.

Other objects, features and advantages of the invention(s) disclosed herein may become apparent in light of the following illustrations and descriptions thereof.

BRIEF DESCRIPTION OF THE DRAWINGS

Reference will be made in detail to embodiments of the disclosure, non-limiting examples of which may be illustrated in the accompanying drawing figures (FIGs). The figures may generally be in the form of diagrams. Some elements in the figures may be stylized, simplified or exaggerated, others may be omitted, for illustrative clarity.

Although the invention is generally described in the context of various exemplary embodiments, it should be understood that it is not intended to limit the invention to these particular embodiments, and individual features of various embodiments may be combined with one another. Any text (legends, notes, reference numerals and the like) appearing on the drawings are incorporated by reference herein.

Some elements may be referred to with letters ("AS", "CBR", "CF", "CLS", "FC", "MA", "MT", "TCM", etc.) rather than or in addition to numerals. Some similar (including substantially identical) elements in various embodiments may be similarly numbered, with a given numeral such as "310", followed by different letters such as "A", "B", "C", etc. (resulting in "310A", "310B", "310C"), and may collectively (all of them at once) referred to simply by the numeral ("310").

Figure 1:
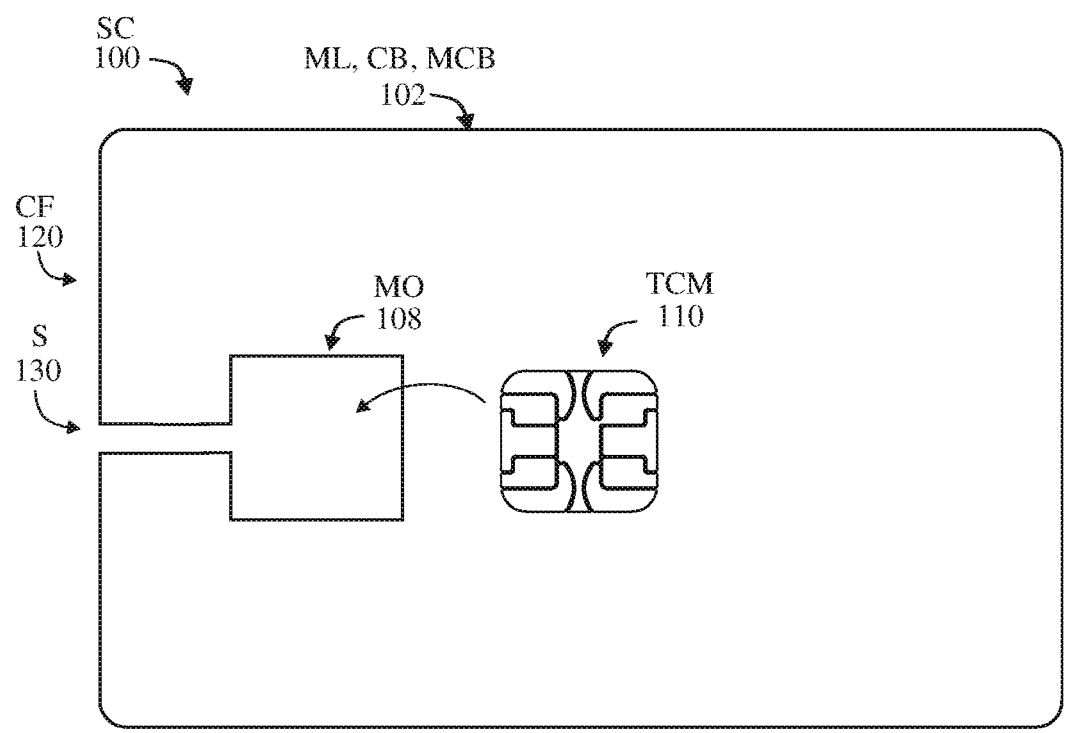
Figure 3:
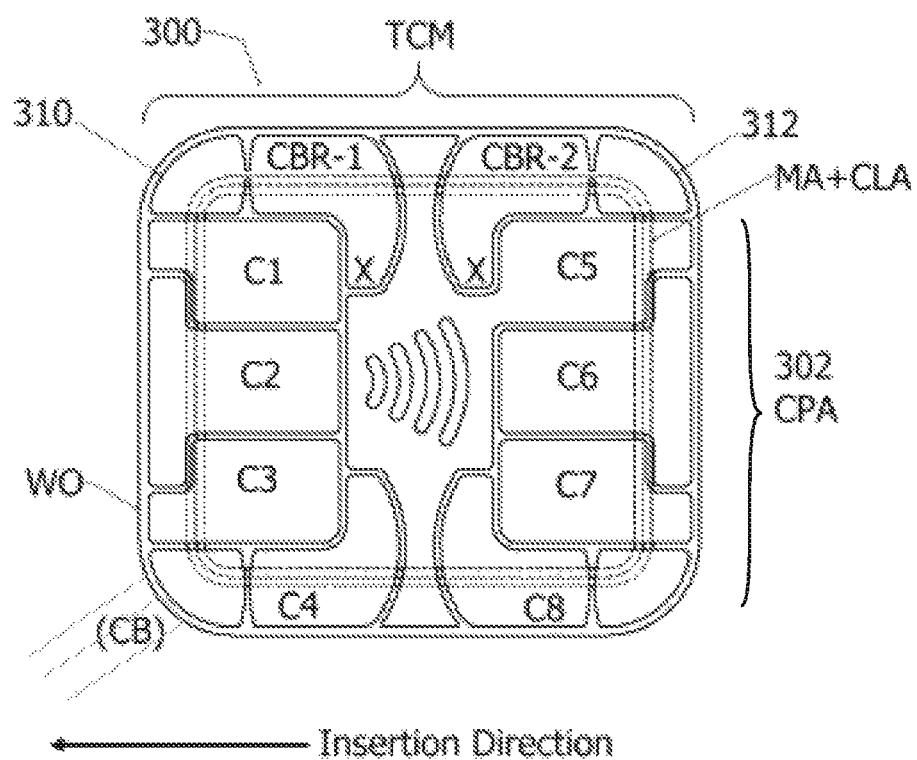

FIG. 1 (compare FIG. 3 of U.S. Pat. No. 9,836,684) is a diagrammatic view of a front surface of a smartcard (SC) which may be a metal card, composite metal card or encapsulated metal card having a slit (S) to function as a coupling frame (CF), according to the prior art.

Figure 2:
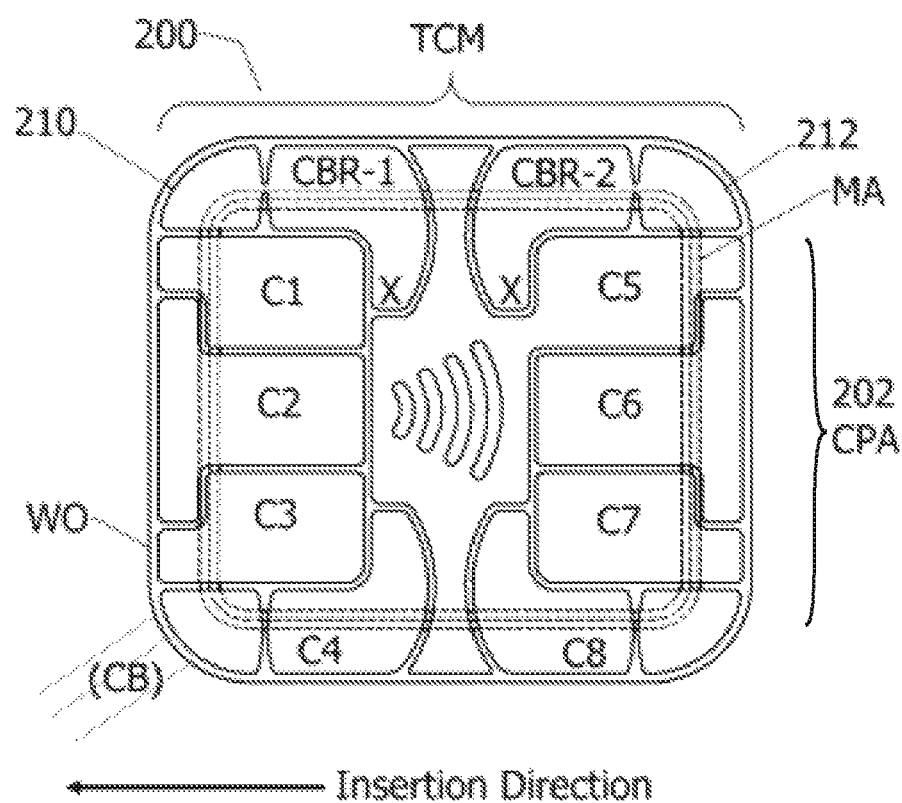

FIG. 2 (compare FIG. 2B of U.S. Pat. No. 9,489,613) is a diagram (plan view) of a contact side of a transponder chip module (TCM), according to the prior art.

FIG. 3 (compare FIG. 3 of 62/981,040) is a diagram (plan view) of the contact pad arrangement (CPA) of a transponder chip module (TCM) or inductive coupling chip module (ICM) having on its rear side a module antenna (MA) with an integrated coupling loop antenna (CLA), according to the invention.

Figure 3A:
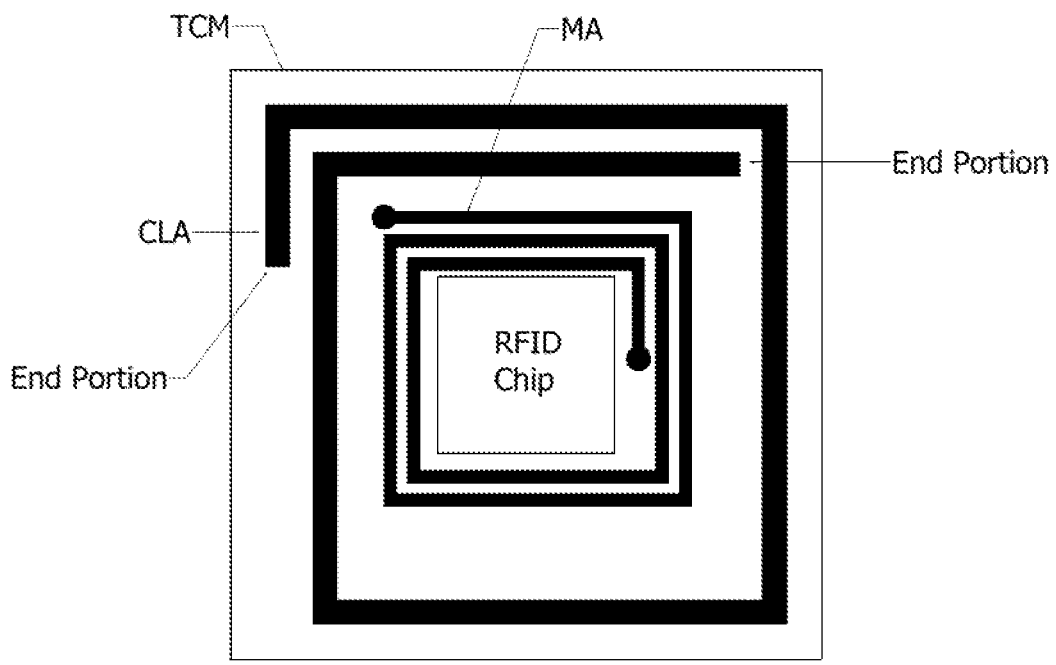

FIG. 3A (compare FIG. 3A of 62/981,040) is a diagram (plan view) of the antenna structures on the rear side of a transponder chip module (TCM) comprising a coupling loop antenna (CLA) having two end portions (or ends) surrounding a module antenna (MA), according to the invention.

Figure 3B:
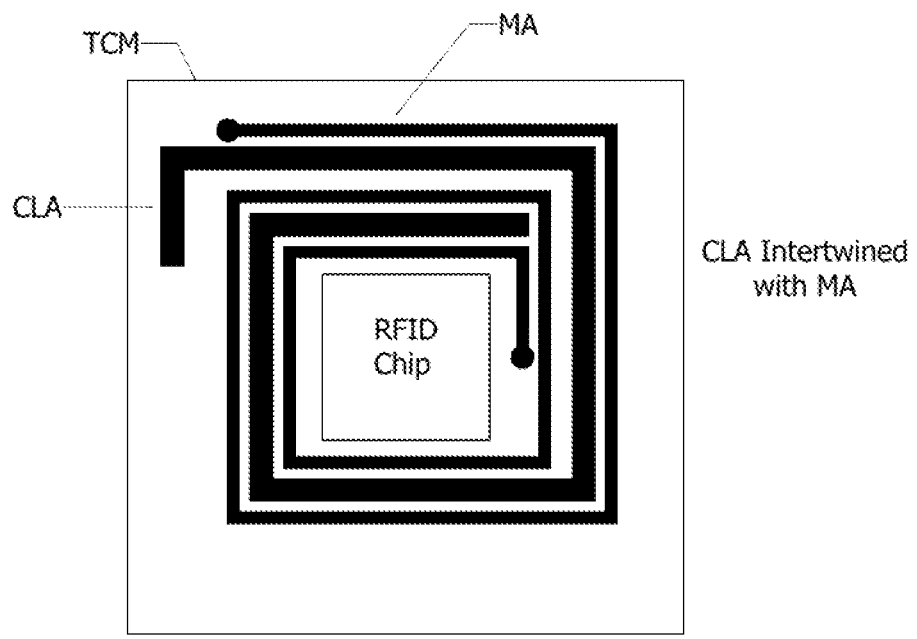

FIG. 3B (compare FIG. 3B of 62/981,040) is a diagram (plan view) of the antenna structures on the rear side of a transponder chip module (TCM) comprising a coupling loop antenna (CLA) having two end portions (or ends) and intertwined with the antenna tracks of the module antenna (MA), according to the invention.

Figure 4A:
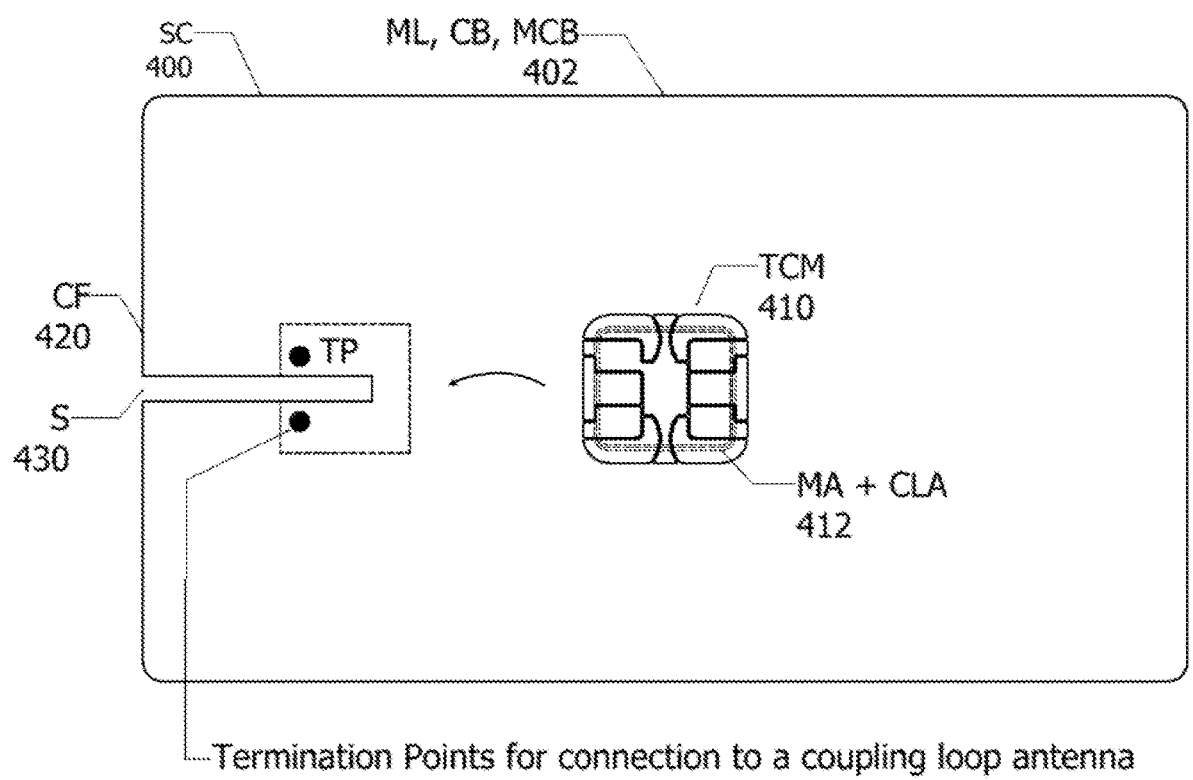

FIG. 4A (compare FIG. 4 of 62/981,040) is a diagram (plan view) of a smartcard (SC) having a card body (CB) which may be a metal layer (ML) or a metal card body (MCB), with a slit (S) to function as a coupling frame (CF), and showing a transponder chip module (TCM) having a module antenna (MA) and a coupling loop antenna (CLA), showing ends of a coupling loop antenna (CLA) which may be electrically connected with termination points (TP) on a coupling frame (CF), according to the invention.

Figure 4B:
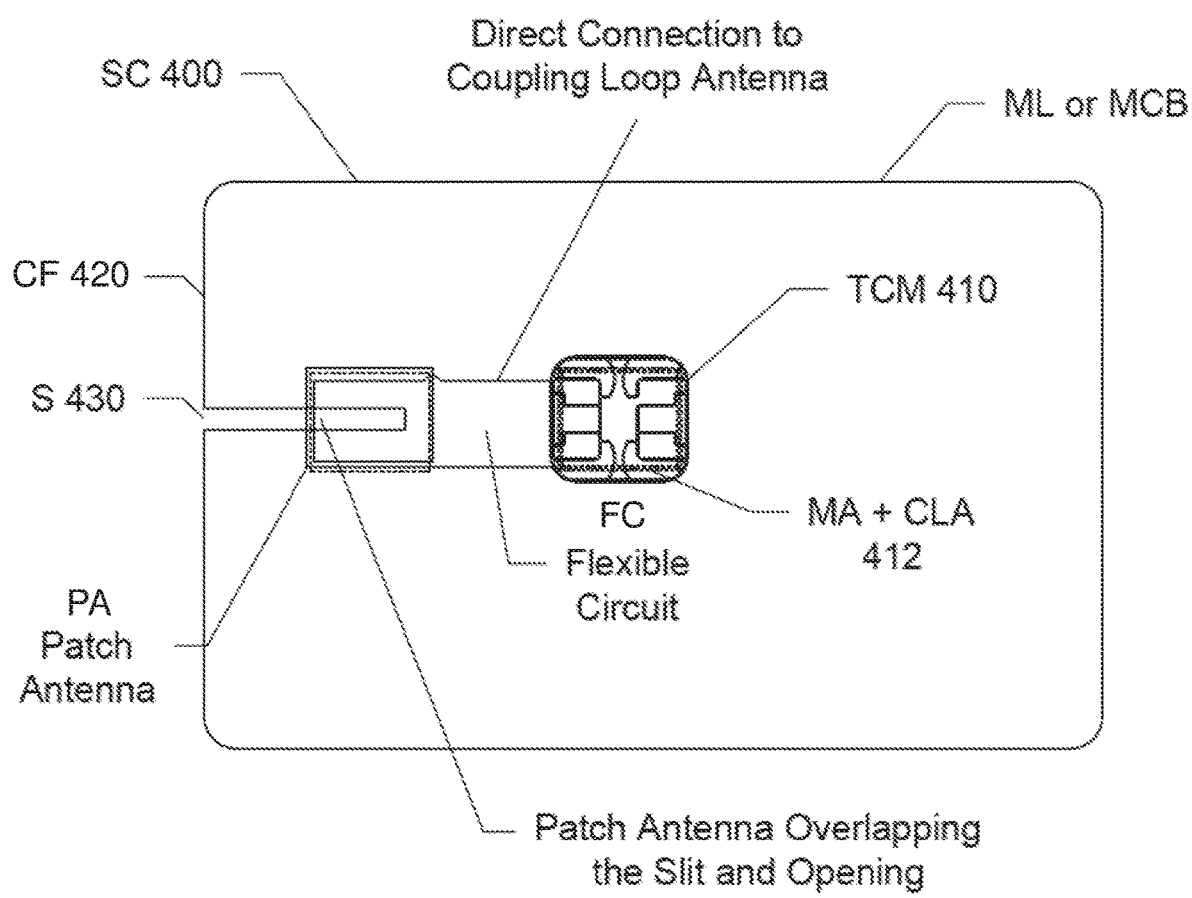

FIG. 4B (compare FIG. 5 of 62/981,040) is a diagram (plan view) of a smartcard (SC) having a card body (CB) which may be a metal layer (ML) or a metal card body (MCB), with a slit (S) to function as a coupling frame (CF), and showing a transponder chip module or an inductive coupling chip module (ICM) having a module antenna (MA) and a coupling loop antenna (CLA), with the end portions (wire-ends) of the coupling loop antenna (CLA) connected to a patch antenna to pick up surface currents around the area of the slit or opening by means of inductive coupling, according to the invention.

Figure 5:
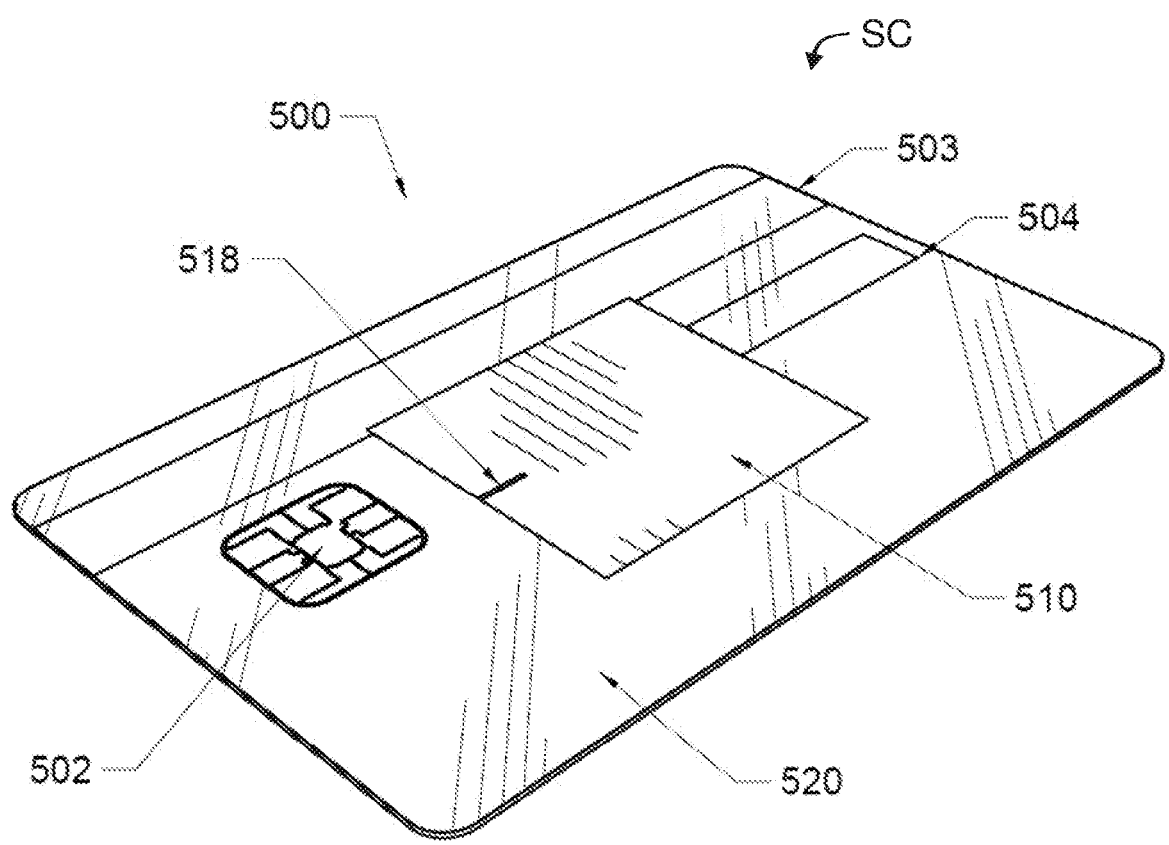

FIG. 5 (compare FIG. 5 of 62/986,612) is an ornamental design for a transparent or translucent smartcard with a metal piece having a slit, and positioned in the center of the card body, according to the invention.

Figure 6A:
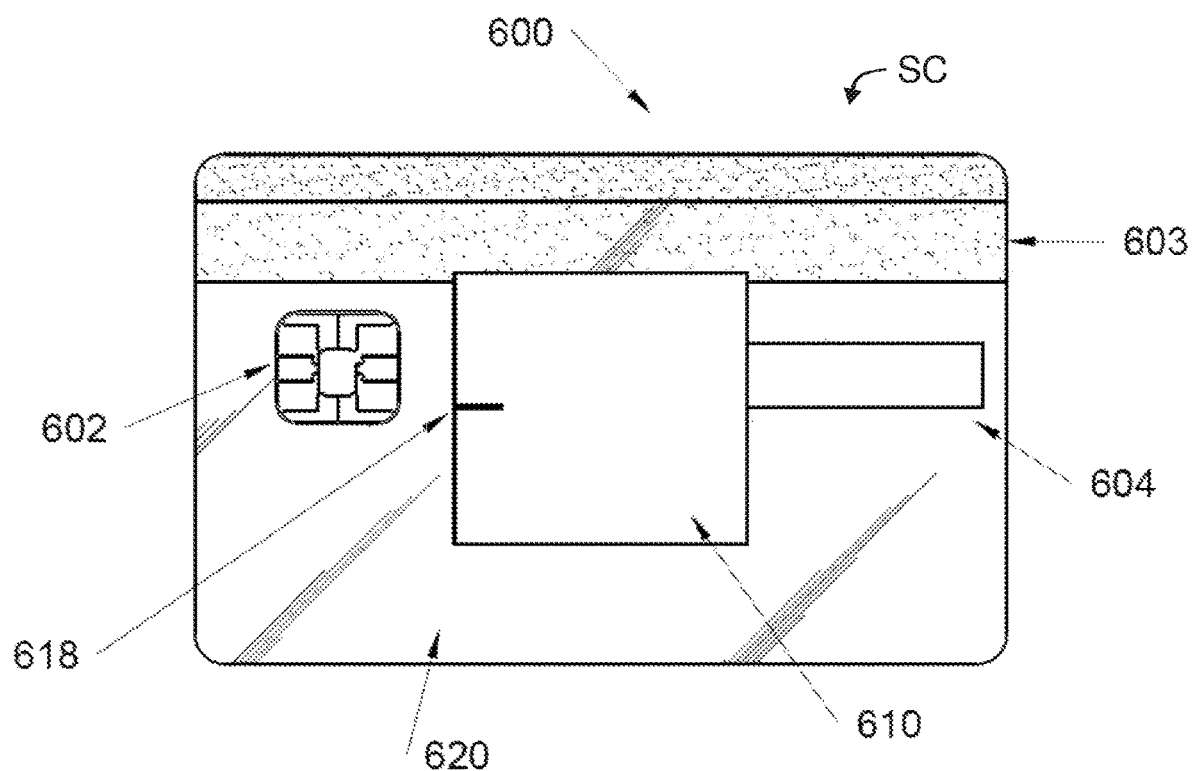

FIG. 6A (compare FIG. 6A of 62/986,612) is a front view of a metal-containing transparent smartcard with the metal layer having a slit, according to the invention.

Figure 6B:
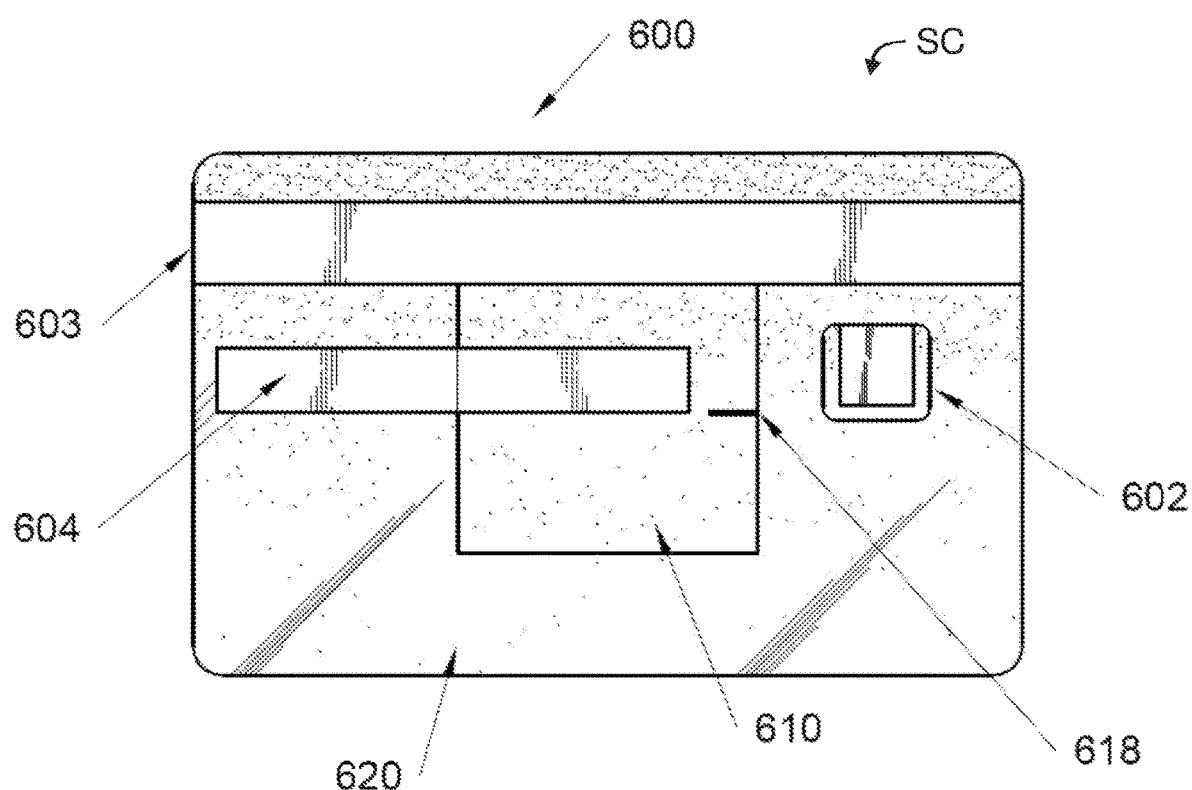

FIG. 6B (compare FIG. 6B of 62/986,612) is a rear view of the metal-containing card shown in FIG. 6A, according to the invention.

Figure 7:
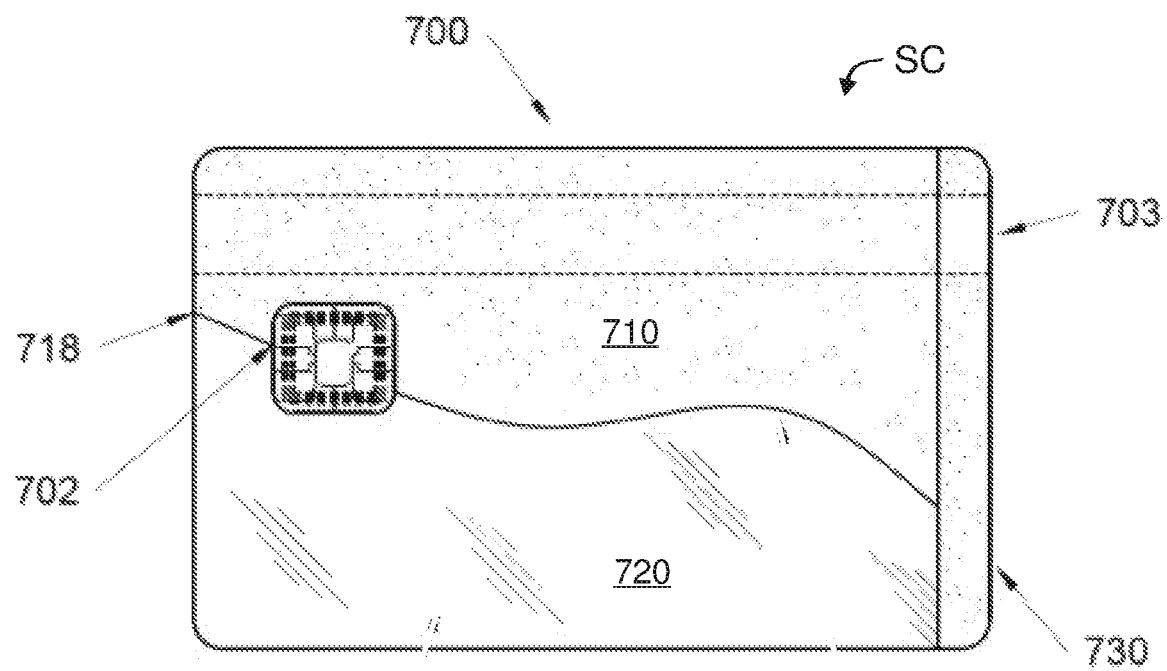

FIG. 7 (compare FIG. 7 of 62/986,612) shows a front view of a metal-containing smartcard having a portion of the card body made of a transparent or translucent material while the rest of the card body is made of metal, with the transponder chip module implanted in the area interfacing the transparent material and the metal, according to the invention.

Figure 8:
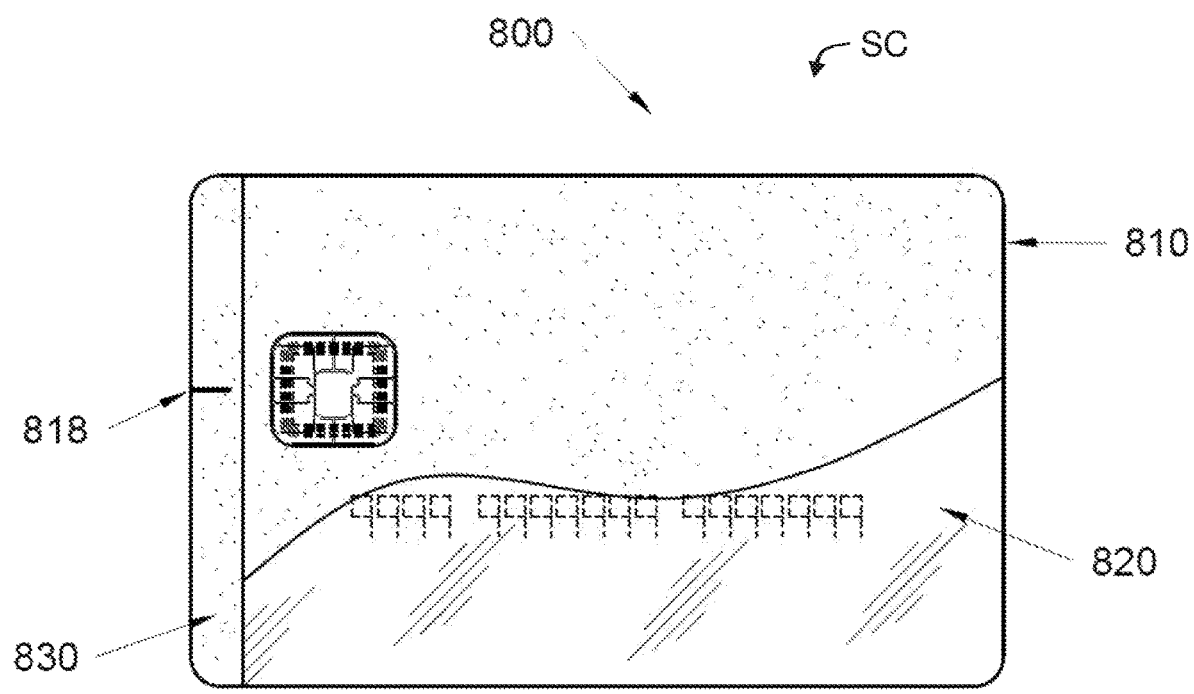

FIG. 8 (compare FIG. 8 of 62/986,612) shows a front view of an alternative design of a metal-containing smartcard having a portion of the card body made of a transparent or translucent material while the rest of the card body is made of two metal substrates, with one of the metal substrates disposed with a slit or notch, according to the invention.

Figure 9:
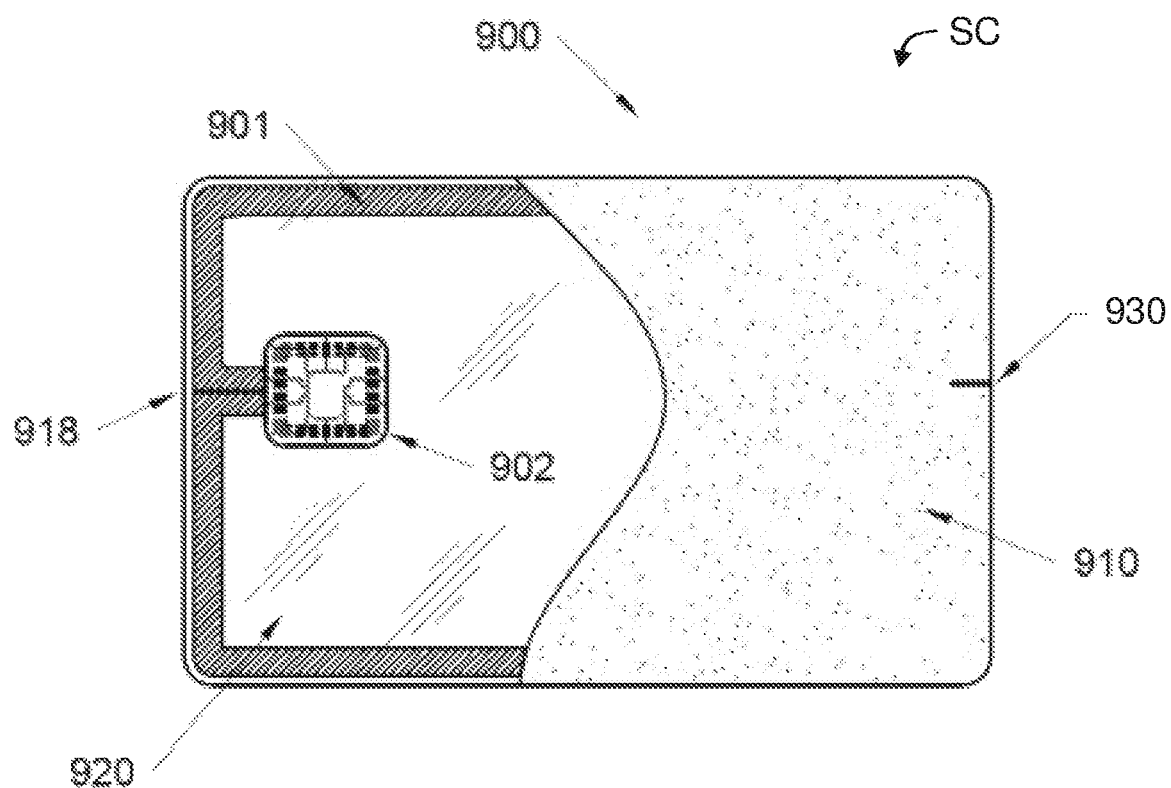

FIG. 9 (compare FIG. 9 of 62/986,612) shows a front view of a metal-containing smartcard having a left portion of the card body made of a transparent or translucent material with an underlying antenna track surrounding a transponder chip module, while the other half (right side) of the card body is made of metal having a slit, according to the invention.

Figure 10:
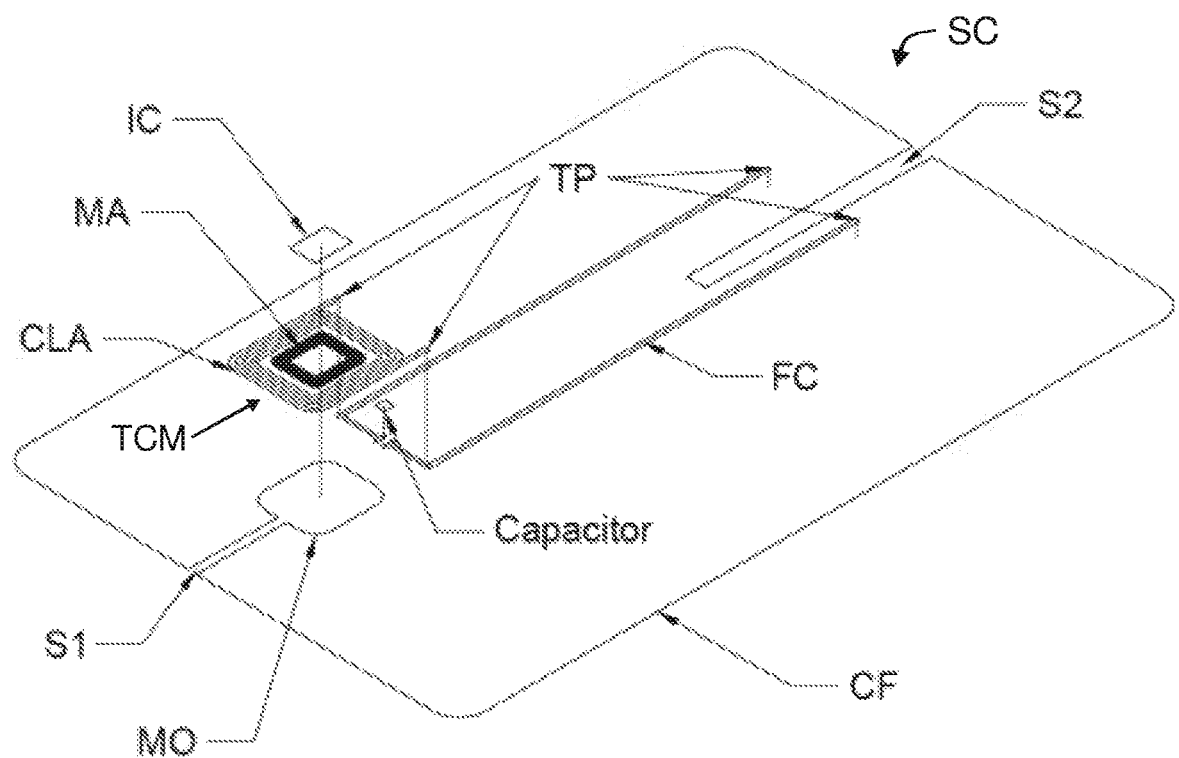

FIG. 10 (compare FIG. 10 of 62/986,612) is a diagram (plan view) of a coupling frame (CF) showing the elements of an inductive coupling chip module (ICM) and a coupling loop antenna (CLA) with the end portions ending in termination points (TPs) directly connected across a discontinuity in the form of a slit (S), according to the invention.

Figure 11:
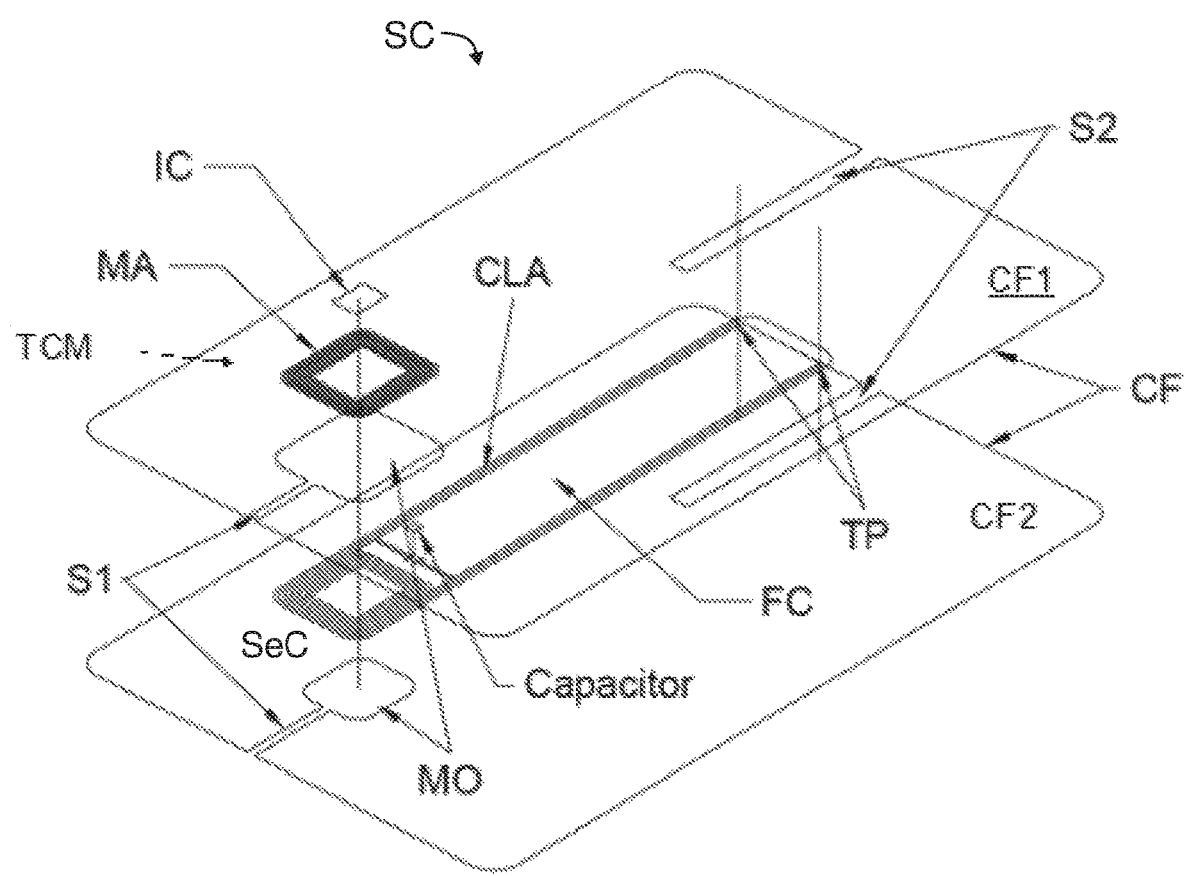

FIG. 11 (compare FIG. 11 of 62/986,612) is an exploded view of a coupling frame stack forming a card body (CB) and showing the elements of an inductive coupling chip module (ICM) and a coupling loop antenna (CLA), according to the invention. The coupling loop antenna (CLA) may be similar to a coupling loop structure (CLS).

Figure 12:
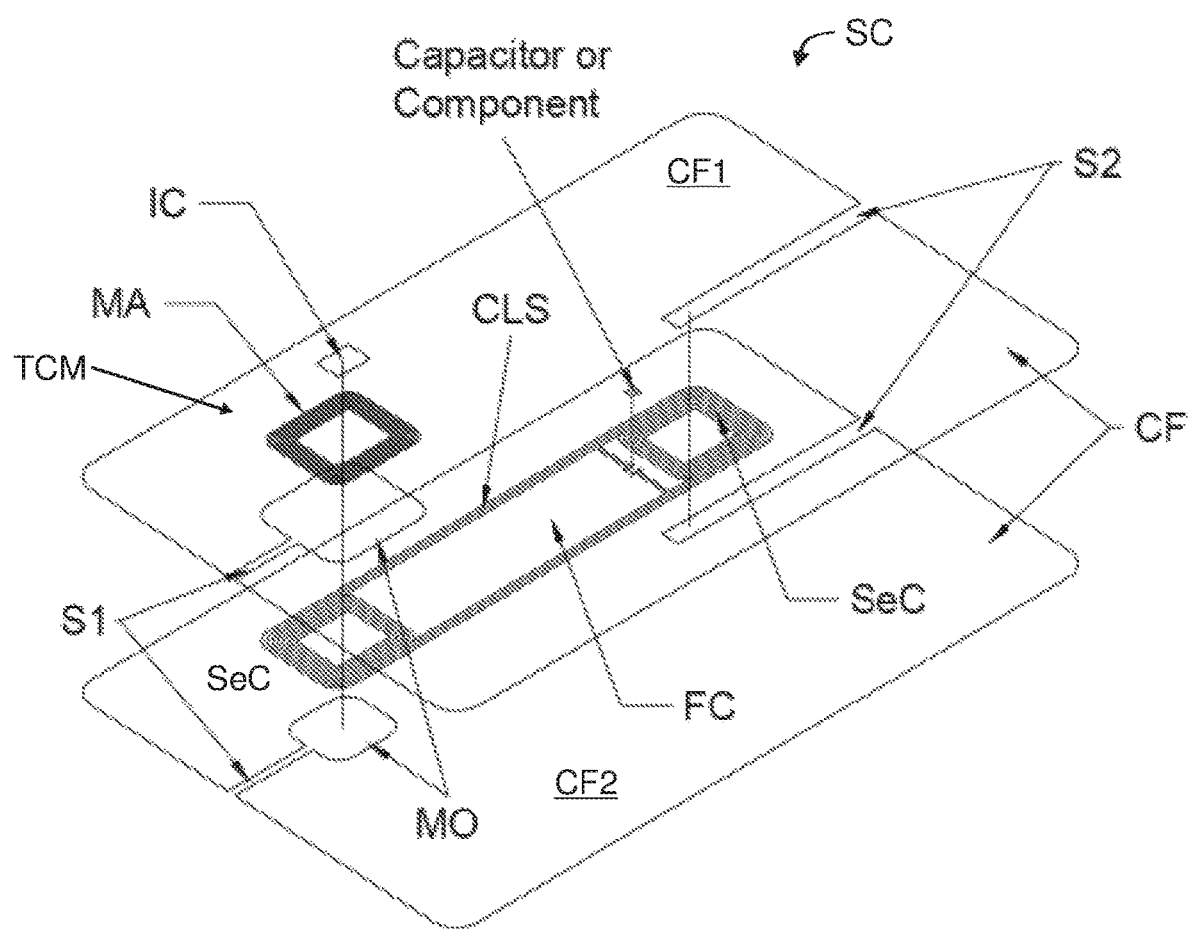

FIG. 12 (compare FIG. 12 of 62/986,612) is a diagram (in perspective view, exploded) of two coupling frames (CF) stacked one atop the other, according to the invention.

Figure 13:
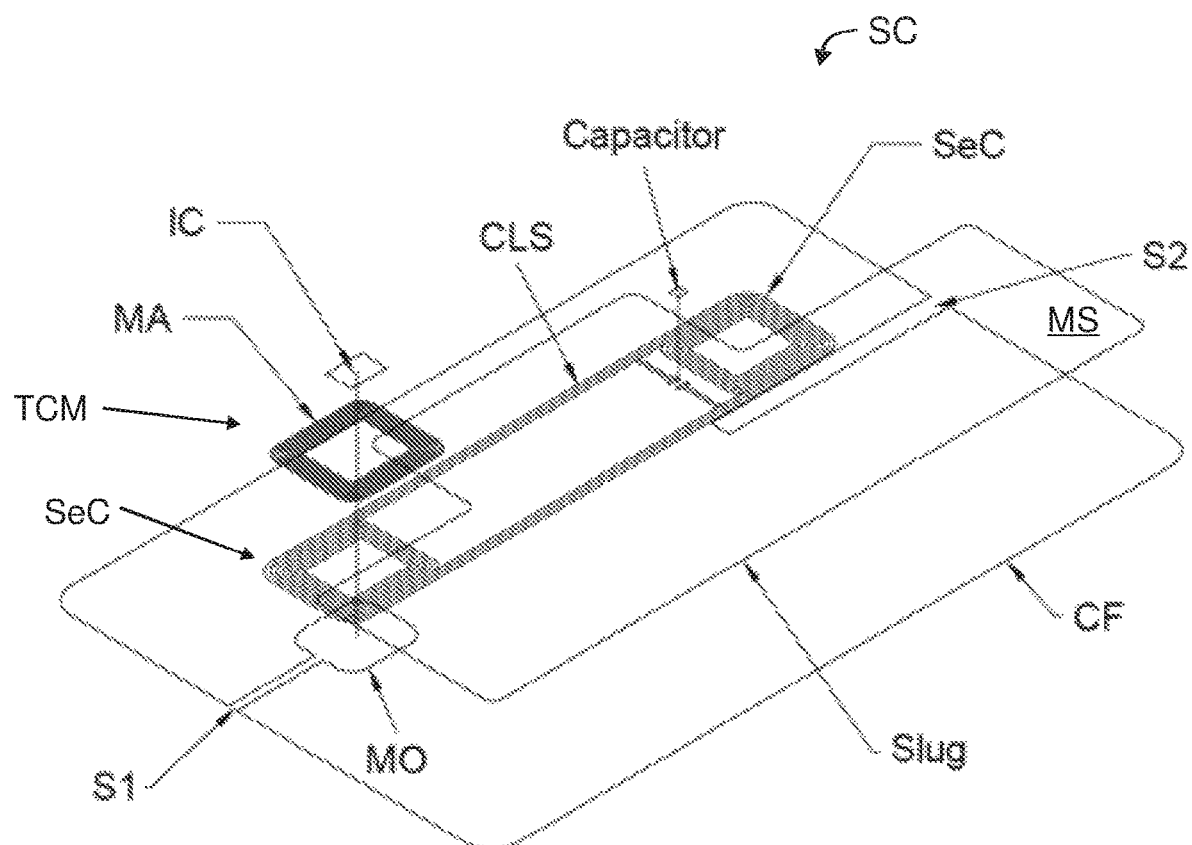

FIG. 13 (FIG. 13 of 62/986,612) is a diagram (in perspective view, exploded) of a metal slug mounted on top of a metal layer, according to the invention.

Figure 14:
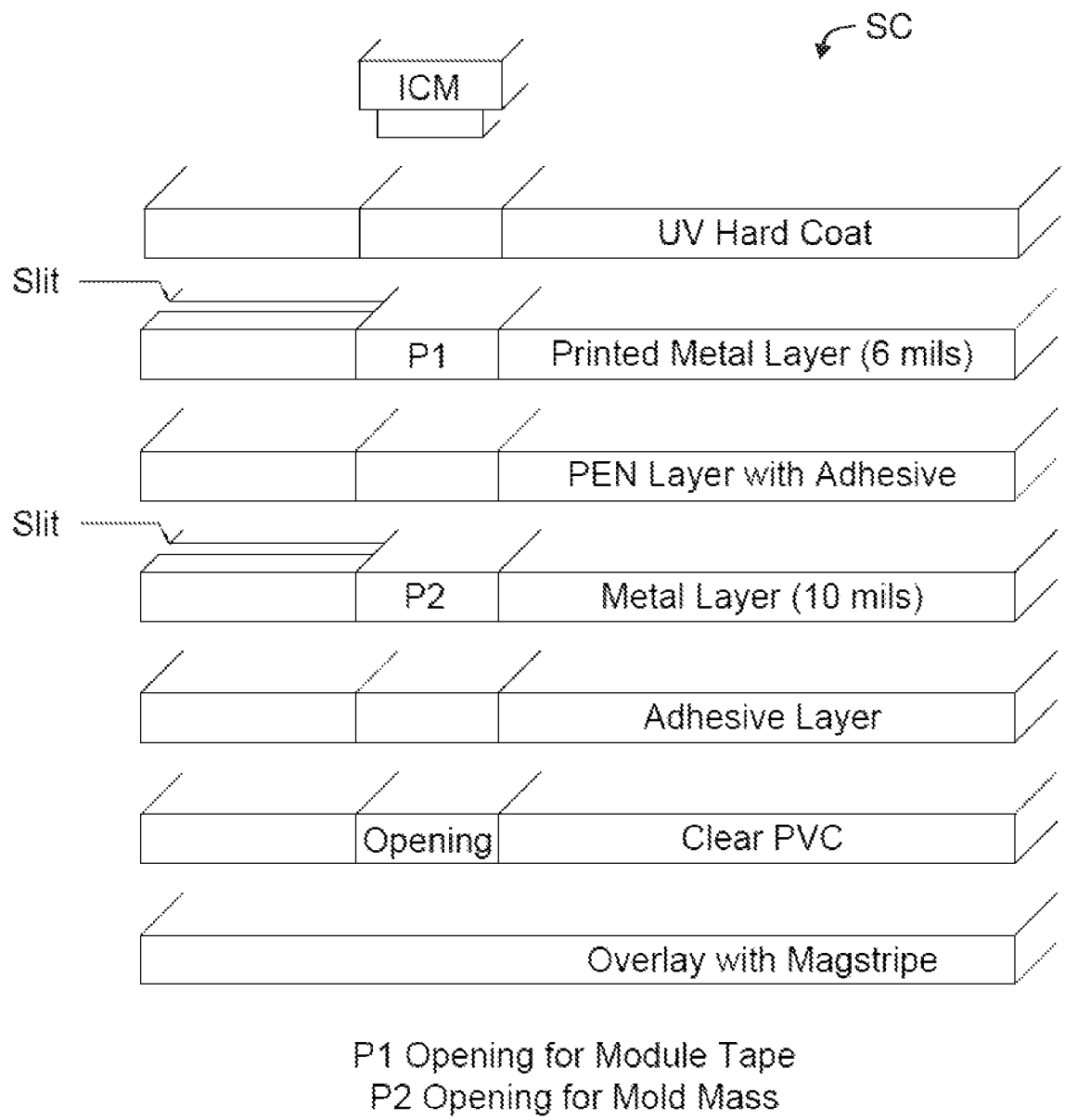

FIG. 14 (compare FIG. 1 of 63/031,571) is a diagram, in cross-section (exploded, and partially perspective), of a "Metal Face" transaction card showing a stacking of layers for a transaction card construction. An inductive coupling chip module (ICM) for inserting in openings (module opening) in the layers of the transaction card is shown, according to the invention.

Figure 15:
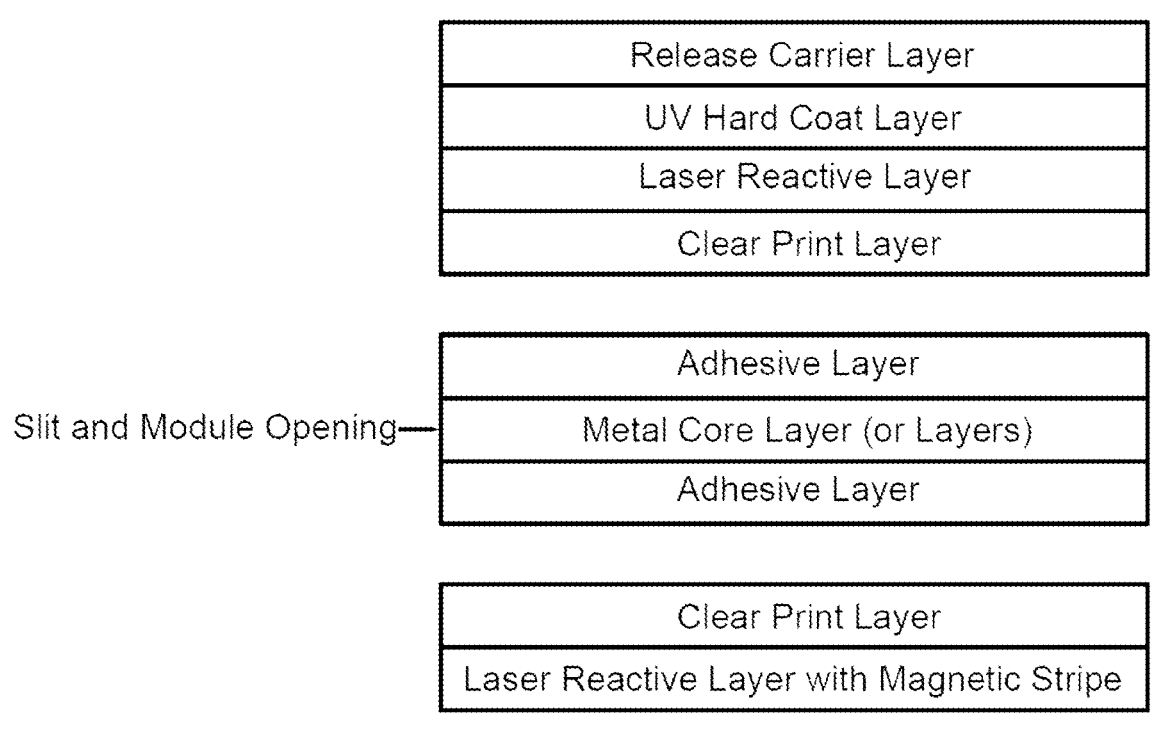

FIG. 15 (compare FIG. 2 of 63/031,571) is a cross-sectional diagram (not to scale) of a metal transaction card, according to the invention.

Figure 16:
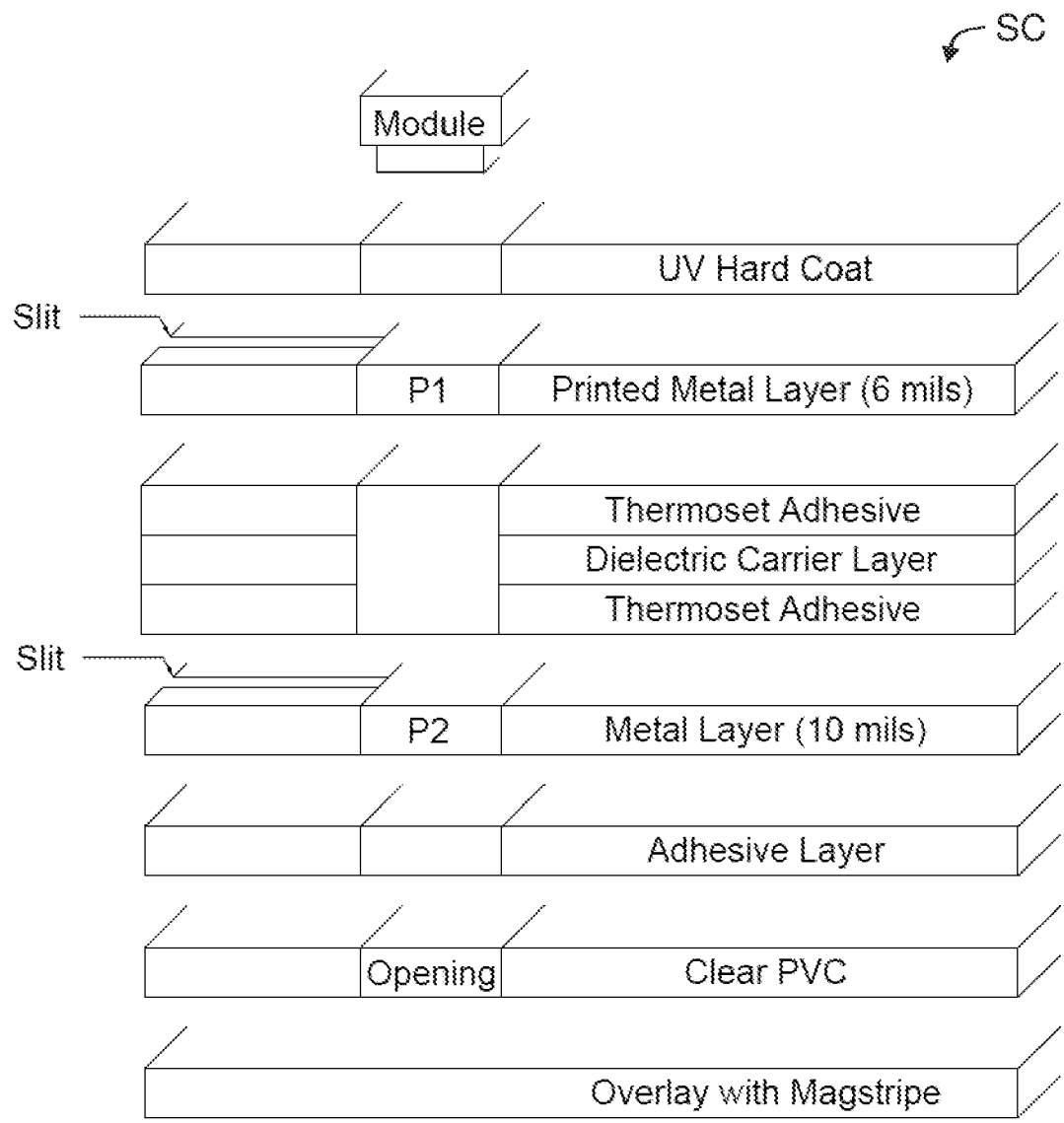

FIG. 16 (compare FIG. 3 of 63/031,571) is a diagram, in cross-section (exploded, and partially perspective), of a "Metal Face" transaction card showing a stacking of layers for a transaction card construction. The two metal layers are separated by a double-sided adhesively coated dielectric carrier layer. An inductive coupling chip module for inserting in openings (module opening) in the layers of the transaction card is shown, according to the invention.

Figure 17:
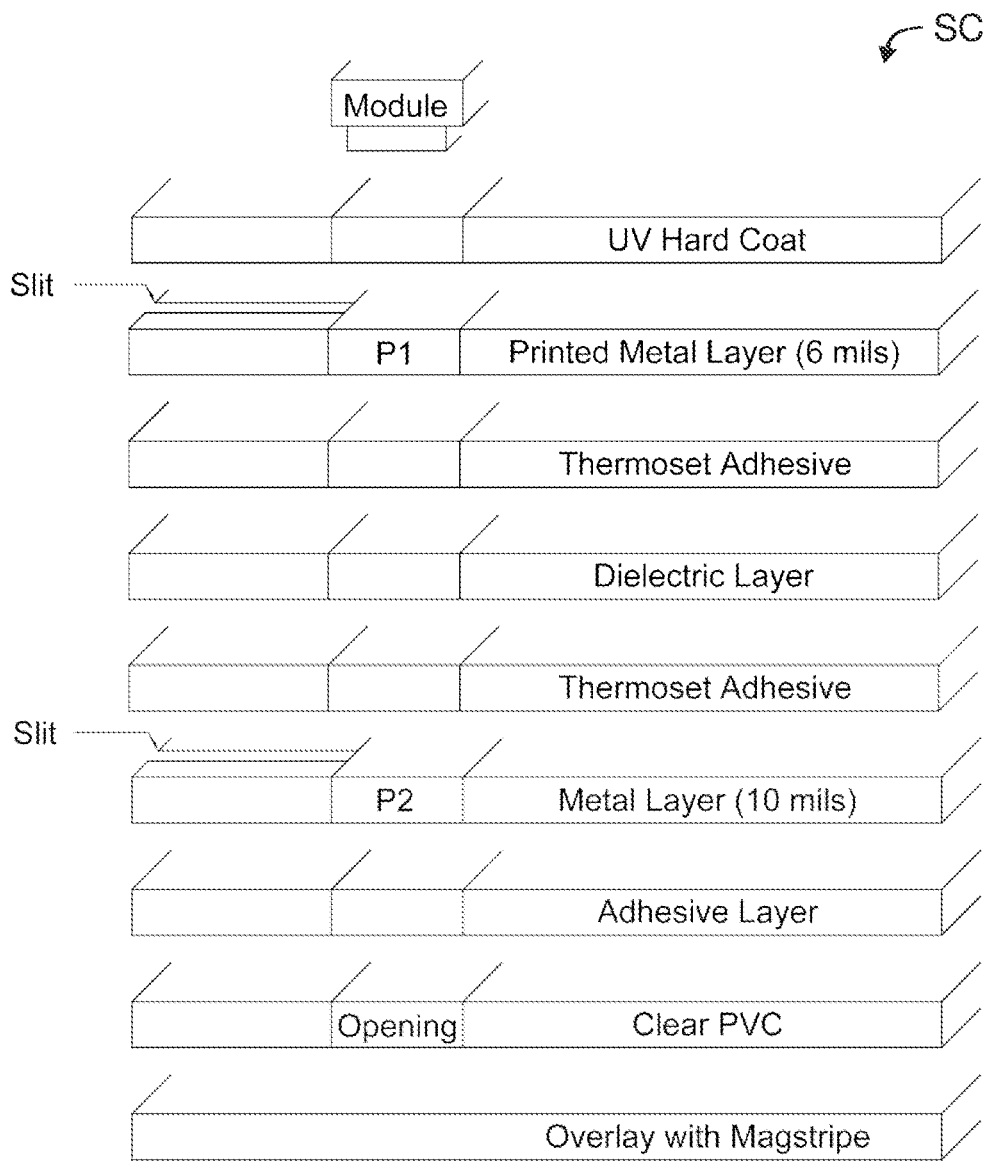

FIG. 17 (compare FIG. 4 of 63/031,571) is a diagram, in cross-section (exploded, and partially perspective), of a "Metal Face" transaction card showing a stacking of layers for a transaction card construction. The two metal layers are separated by three layers, comprising a first thermosetting adhesive layer, a dielectric layer, and a second thermosetting adhesive layer. An inductive coupling chip module for inserting in openings (module opening) in the layers of the transaction card is shown, according to the invention.

DESCRIPTION

Various embodiments (or examples) may be described to illustrate teachings of the invention(s), and should be construed as illustrative rather than limiting. It should be understood that it is not intended to limit the invention(s) to these particular embodiments. It should be understood that some individual features of various embodiments may be combined in different ways than shown, with one another. Reference herein to "one embodiment", "an embodiment", or similar formulations, may mean that a particular feature, structure, operation, or characteristic described in connection with the embodiment is included in at least one embodiment of the present invention. Some embodiments may not be explicitly designated as such ("an embodiment").

The embodiments and aspects thereof may be described and illustrated in conjunction with systems, devices and methods which are meant to be exemplary and illustrative, not limiting in scope. Specific configurations and details may be set forth in order to provide an understanding of the invention(s). However, it should be apparent to one skilled in the art that the invention(s) may be practiced without some of the specific details being presented herein. Furthermore, some well-known steps or components may be described only generally, or even omitted, for the sake of illustrative clarity. Elements referred to in the singular (e.g., "a widget") may be interpreted to include the possibility of plural instances of the element (e.g., "at least one widget"), unless explicitly otherwise stated (e.g., "one and only one widget").

In the following descriptions, some specific details may be set forth in order to provide an understanding of the invention(s) disclosed herein. It should be apparent to those skilled in the art that these invention(s) may be practiced without these specific details. Any dimensions and materials or processes set forth herein should be considered to be approximate and exemplary, unless otherwise indicated. Headings (typically underlined) may be provided as an aid to the reader, and should not be construed as limiting.

Reference may be made to disclosures of prior patents, publications and applications. Some text and drawings from those sources may be presented herein, but may be modified, edited or commented to blend more smoothly with the disclosure of the present application.

In the main hereinafter, RFID cards and electronic tags in the form of pure contactless cards, dual interface cards and electronic identity cards may be discussed as exemplary of various features and embodiments of the invention(s) disclosed herein. As will be evident, many features and embodiments may be applicable to (readily incorporated in) other forms of smartcards, such as EMV payment cards, metal composite cards, encapsulated metal cards, solid metal cards, metal veneer cards, metal hybrid cards, metal foil cards, access control cards and secure credential cards. As used herein, any one of the terms "transponder", "tag", "smartcard", "data carrier", "wearable device" and the like, may be interpreted to refer to any other of the devices similar thereto which operate under ISO 14443 or similar RFID standard.

Smartcard with Coupling Frame

FIG. 1 illustrates a smartcard (SC) which may be a metal card, composite metal card or encapsulated metal card having a slit (S) to function as a coupling frame (CF). Compare FIG. 3 of U.S. Pat. No. 9,836,684 (3## reference numerals changed to 1##).

This figure illustrates the front side of a smartcard (SC) 100 which may be a metal card having a metal layer (ML), which may constitute substantially the entire thickness of the card body (CB) 102. The card body (CB) may have a module opening (MO) 108 wherein a transponder chip module (TCM) 110 may be disposed, and a slit (S) 130 extending from the module opening (MO) to the outer perimeter of the metal layer (ML) so that the metal card body (MCB) 102 may function as a coupling frame (CF) 120. The metal layer (ML) (or card body CB, or metal card body MCB) may comprise titanium, and is provided with a slit, slot or gap in the metal to create an open loop coupling frame closely adjacent to and substantially fully surrounding the transponder chip module (TCM). The slit (S) may overlap a portion of the module antenna (MA) 112 of the transponder chip module (TCM).

From the teachings of '684, it is apparent that the slit (S) extends from a perimeter edge of the metal card body (MCB) to a module opening (MO) to accept a transponder chip module (TCM), whereby the slit (S) may overlap a portion of the module antenna (MA) of the transponder chip module (TCM).

FIG. 2 is a diagram (plan view) of a contact side of a transponder chip module (TCM) 200, according to the prior art. Connection bridges 210+212 and a contact pad arrangement 202 (CPA; C1-C8) are disposed on the front face, and a module antenna (MA) is disposed on the rear face for inductive coupling with a coupling frame (CF) disposed with a slit (S) and a module opening (MO).

200 transponder chip module (TCM)
    202 contact pad array (CPA)
    210 connection bridge (CBR)
    212 connection bridge (CBR)
        CB card body
        TCM transponder chip module (dual interface)
        MA module antenna
        WO window opening in the card body (CB) wherein the TCM is inserted This disclosure relates to the field of RFID-enabled metal transaction cards and, more particularly, metal transaction cards having a transponder chip module (TCM) (aka an inductive coupling chip module (ICM)) with the module antenna (MA) paired to a coupling loop antenna (CLA) with the end portions of the antenna galvanically (physically) connected to termination points across a discontinuity in a metal card body.

Some Improvements to RFID Slit Technology

The current invention makes use of the surface eddy currents which flow along the perimeter edge of a conductive surface such as a metal layer (ML) or metal card body (MCB) which has been exposed to electromagnetic waves, generated by a contactless reader or point of sale terminal. The intensity of such eddy currents at the frequency of interest is a maximum along the skin depth of the metal at its perimeter edge. The skin depth of copper, for example, at 13.56 MHz is approximately 18 µm.

The distance in which a slit (S), gap (G) or notch (N) needs to extend from the perimeter edge across the metal layer (ML) or metal card body (MCB), concentrating the surface current density, needs to be a substantial multiple of the skin depth distance to facilitate the diversion of current. Notably, the slit (S), gap (G) or notch (N) passes entirely through the metal layer (ML, MCB). The shape of the slit or notch can be straight, curved, angled, u-shaped or have the form of a musical instrument such as a saxophone, signature (clef) or the name of a payment scheme.

A slit (S) in a metal layer (ML) or metal card body (MCB) to function as a coupling frame (CF) may extend from a perimeter edge to an opening (MO) in the layer or card body. The opening (MO) may be regarded as an extension of the slit (S), allowing the surface current to be directed and to flow around the inner edges of the opening. In the case of a metal layer (ML) or metal card body (MCB) without an opening, the surface current may be directed in another manner to the transponder chip module (TCM), by physically connecting a flexible circuit (FC) or flex-tape to termination points (TP) on each side of the slit (S).

Such metal transaction cards may comprise (i) a metal card body (MCB) with a slit (S) acting as a coupling frame (CF) having termination points (TP) on each side of the slit (S), (ii) a coupling loop antenna (CLA) with two end portions tightly coupled to a module antenna (MA) connected to an RFID chip (IC) in a transponder chip module (TCM) and (iii) the end portions of the coupling loop antenna (CLA) are electrically connected to the termination points (TP) on each side of the slit (S) of the coupling frame (CF).

U.S. D756,317 (2016 May 17; Finn et al.) discloses Layout For Contact Pads and Connection Bridges of a Transponder Chip Module.

US 20150129665 (2015 May 14; Finn et al.) discloses CONNECTION BRIDGES FOR DUAL INTERFACE TRANSPONDER CHIP MODULES. Connection bridges (CBR) for dual-interface transponder chip modules (TCM)

200 may have an area which is substantially equal to or greater than an area of a contact pad (CP) of a contact pad array (CPA). A given connection bridge may be L-shaped and may comprise (i) a first portion disposed external to the contact pad array and extending parallel to the insertion direction, and (ii) a second portion extending from an end of the first portion perpendicular to the insertion direction to within the contact pad array (CPA) such as between C1 and C5. The connection bridge may extend around a corner of the contact pad array, may be large enough to accommodate wire bonding, and may be integral with a coupling frame (CF) extending around the contact pad array. The transponder chip modules may be integrated into a smart card (SC).

FIG. 3 is a diagram (plan view) of the contact pad arrangement (CPA) 302 of a transponder chip module (TCM) 300 or inductive coupling chip module (ICM) 300 having on its rear side a module antenna (MA) with an integrated coupling loop antenna (CLA). It differs from the prior art (FIG. 2) in that a coupling loop antenna (CLA) forms part of the antenna circuitry including the module antenna (MA) on the rear face or bond side of the transponder chip module (TCM) 300.

300 transponder chip module (TCM)
302 contact pad array (CPA)
310 connection bridge (CBR)
312 connection bridge (CBR)
  CB card body
  TCM transponder chip module (dual interface)
  MA module antenna
  CLA coupling loop antenna
  WO window opening in the card body (CB) wherein the TCM is inserted FIG. 3A is a diagram of the antenna structures (MA+CLA) on the rear side of the transponder chip module (TCM) 300 as presented in FIG. 3, comprising a coupling loop antenna (CLA) having two end portions (or ends) surrounding the module antenna (MA) which is connected to the RFID chip (not shown).

FIG. 3B is a circuit diagram of the antenna structures (MA+CLA) on the rear side of the transponder chip module (TCM) 300 as presented in FIG. 3, comprising a coupling loop antenna (CLA) having two end portions (or ends) intertwined with the antenna tracks of the module antenna (MA) which is connected to the RFID chip (not shown).

FIG. 4A is a diagram (plan view) of a smartcard (SC) 400 having a card body (CB) 402 which may be a metal layer (ML), conductive network (CN) or a metal card body (MCB), with a slit (S) 430 to function as a coupling frame (CF) 420, and showing a transponder chip module (TCM) 410 having a module antenna and a coupling loop antenna formed together (MA+CLA) 412, and showing termination points (TP) on a coupling frame (CF) which may be electrically connected with the end portions of a coupling loop antenna (CLA).

400 smartcard (SC)
402 metal layer (ML) in a card body (CB), or a metal card body (MCB)
410 transponder chip module (TCM)
412 module antenna (MA) and coupling loop antenna (CLA) in the TCM
430 slit (S) in the metal layer (ML) or metal card body (MCB)
420 coupling frame (CF) resulting from a metal layer or metal card body having a slit
TP termination points for connection to a coupling loop antenna (CLA)

Note that there is no module opening (MO) shown in this configuration

The coupling loop antenna (CLA) with connection pads (end portions) for attachment to the termination points (TPs) on the metal layer (ML) may be a flexible tape, a FR4 material, a Kapton film or any sort of flexible circuit (FC) with conductive traces and circuit elements.

In a different iteration of the above without a physical interconnection to termination points (TPs) across the slit (S), the coupling loop antenna (CLA) on a flexible circuit (FC) may be connected to a sense coil (SeC) which in turn inductively captures surface currents by overlapping the metal edge of the slit (S).

In a further iteration of the abovementioned, the coupling loop antenna (CLA) may be a single turn on a flexible circuit (FC). The coupling loop antenna as a single track (with a width of approximately 1.25 mm) having the same shape as the module antenna (MA) in the transponder chip module (TCM) may overlap the module antenna (MA) with a track width having multiple turns of 2.5 mm, so that the overlap of the single turn represents 50% of the windings of the module antenna in terms of area. The antenna structures on the flexible circuit (FC) may also be referred to as a coupling loop structure (CLS) as described in the definitions.

FIG. 4B is a diagram (plan view) of a smartcard (SC) 400 having a card body (CB) which may be a metal layer (ML) or a metal card body (MCB), with a slit (S) 430 to function as a coupling frame (CF) 400, and showing a transponder chip module (TCM) or an inductive coupling chip module (ICM) 410 having a module antenna and a coupling loop antenna combined (MA+CLA) 412, with the end portions (wire-ends) of the coupling loop antenna (CLA) connected to a patch antenna (PA) to pick up surface currents around the area of the slit (S) 430 or opening by means of inductive coupling.

400 smartcard (SC)
402 metal layer (ML) in a card body (CB), or a metal card body (MCB)
410 transponder chip module (TCM)
412 module antenna (MA) and coupling loop antenna (CLA) in the TCM
430 slit (S) in the metal layer (ML) or metal card body (MCB)
420 coupling frame (CF) resulting from a metal layer or metal card body having a slit
TP termination points for connection to a coupling loop antenna (CLA)
FC flexible circuit with a patch antenna (PA) disposed over the slit (S) (and opening), and a direct connection to the coupling loop antenna (CLA)

A sense coil (SeC), patch antenna (PA) or pick-up coil (PuC) may be used to inductively couple with a metal layer (ML) or metal card body (MCB) having a slit (S) to function as a coupling frame (CF) when the metal is exposed to electromagnetic waves generated by a contactless reader or point of sale terminal operating at an ISM frequency of interest, for example at 13.56 MHz.

The sense coil (SeC), patch antenna (PA) or pick-up coil (PuC) may overlap the slit (S) or may be integrated within the area of a slit (S) or gap (G).

This disclosure also relates to the field of RFID-enabled metal transaction cards and, more particularly, metal containing transaction cards having a transponder chip module with a module antenna overlapping an interface between a conductive surface and a non-conductive surface without the need for a slit.

FIG. 5 shows an ornamental design for a transparent or translucent smartcard with a metal piece positioned in the center of the card body. The metal piece having a slit or notch (a discontinuity in the metal) to concentrate surface current density around the area of the slit or notch when exposed to an electromagnetic field which may be used to power the transponder chip module using a flexible circuit (not shown) to divert current flows. The metal piece also provides weight to the card body.

- 500 smartcard
- 502 transponder chip module (TCM)
- 503 magnetic strip (on rear of card), visible through the card body
- 504 signature panel (on rear of card), visible through the card body
- 510 metal piece
- 518 slit (S) in the metal piece
- 520 transparent or translucent material forming the basis of the card body (CB)

FIG. 6A shows a front view of a metal-containing transparent or translucent smartcard 600 with the metal layer 610 having a slit 618. The metal piece 610 in the center of the card body 600 is surrounded by a transparent or translucent material 620 forming the rest of the card body 600. A transponder chip module TCM) 602 is implanted in the card body 600 and interfaces with the slit 618 via a flexible circuit (not shown). Because the card body is transparent, the magnetic stripe 603 and signature panel 604 are visible. FIG. 6B (FIG. 6B of shows a rear view of the card body 600.

- 600 smartcard
- 602 transponder chip module (TCM)
- 603 magnetic strip (on rear of card), visible through the card body
- 604 signature panel (on rear of card), visible through the card body
- 610 metal piece
- 618 slit (S) in the metal piece
- 620 transparent or translucent material forming the basis of the card body (CB)

For a metal layer (ML) or metal card body (MCB) without a slit (S), the sense coil (SeC), patch antenna (PA) or pick-up coil (PuC) may overlap a perimeter edge of the metal layer (ML) or metal card body (MCB). In a transaction card comprising a metal substrate and a non-conductive substrate, the sense coil, patch antenna or pick-up coil overlaps the interface of the two materials, namely at the junction between the conductive and non-conductive materials.

FIG. 7 shows a front view of a metal-containing smartcard 700 having a portion of the card body (CB) made of a transparent or transparent or translucent material 720 while the rest of the card body is made of two metal pieces 710 & 730. The transponder chip module 702 may be implanted in the card body in the area interfacing the transparent material 720 and metal 710—i.e., overlapping the boundary 718.

- 700 card
- 702 transponder chip module (TCM)
- 710, 730 metal pieces
- 720 transparent or translucent material
- 718 boundary (interface) between the metal piece 710 and the transparent material 720

The line 718 indicates the boundary between the non-metallic material 720 and the metallic material 710, and represents a metal edge (ME) of the metallic portion 710 which can function like a slit (S), in that eddy currents will be present from which energy can be harvested by a module antenna (MA) or patch antenna (PA) overlying the metal edge (ME).

The embedded transponder chip module 702 with its module antenna (MA) connected to an RFID chip picks-up surface currents at this interfacing juncture (718) between the transparent material 720 and the metal 710. The metal may have a slit or notch (not shown), a discontinuity in the metal, to allow for surface current concentration. The channel or recess in the metal (such as stainless steel) to accept a magnetic stripe 703 may be mechanically milled or chemically etched. The latter process avoids magnetization of the metal normally caused by milling.

For the purpose of clarity, the non-conducting material interfacing the conductive material may be extruded plastic, injected molded plastic, laminated plastic or any non-conductive material such as wood, ceramic, precious stone, etc., while the conductive material may be any sort of metal, metal mesh, metal grid or any conductive material or a conductive composite comprising metal filings, metal fiber or conductive nanomaterials.

FIG. 8 shows a front view of an alternative design of a metal-containing smartcard 800 having a portion of the card body 800 made of a transparent or translucent material 820 while the rest of the card body is made of two metal substrates 810 & 830, with one of the metal substrates 830 disposed with a slit or notch 818. The metal substrates are mechanically and electrically connected. The surface currents around the area of the slit 818 can be directed to the transponder chip module 802 using a flexible circuit (not shown) disposed with a sense coil to pick up surface current and direct to a conductive loop structure (CLS) which inductively couples with the module antenna of the transponder chip module. Personalization data can be laser engraved across the transparent material and metal.

- 800 card
- 802 transponder chip module (TCM)
- 810, 830 metal pieces
- 820 transparent or translucent material
- 818 slit (S) in the metal piece 830

FIG. 9 shows a front view of a metal-containing smartcard 900 having a left portion of the card body made of a transparent or translucent material 920 with an underlying antenna track 901 surrounding a transponder chip module 902, while the other half (right side) of the card body 900 is made of metal 910 having a slit 918. The conductive track 901 either wraps around the transponder chip module 902 with a gap formation 918 allowing for inductive coupling with the module antenna of the transponder chip module 902 or the conductive track is electrically connected (galvanic connection) to the module antenna of the transponder chip module 902. The conductive track 901 is electrically connected to the metal 910 with a slit 918.

- 900 card
- 902 transponder chip module (TCM)
- 910 metal piece
- 920 transparent or translucent material
- 930 slit (S) in the metal piece 910 (compare 818)
- 901 antenna track
- 918 gap formed by the antenna track 901

The transparent or translucent material may be laminated to the metal. The metal may be dyed, coated or lacquered. The slit or notch to concentrate surface eddy current density may not be at the position of the transponder chip module. The center of technology may be at the position of the transponder chip module or close to the physical center of the card body.

Directing Surface Currents to an RFID device such as a Transponder Chip Module

As described above, a coupling loop antenna (CLA) is an antenna structure (AS) which couples to a module antenna (MA) in a transponder chip module (TCM). The windings or traces of the coupling loop antenna (CLA) may intertwine those windings of the module antenna (MA), or the windings or traces of the coupling loop antenna (CLA) may couple closely with the windings of the module antenna (MA) similar in function to a primary and secondary coil of a transformer. The termination ends of a coupling loop antenna (CLA) may be connected to termination points (TPs) across a discontinuity in a metal layer (ML) or metal card body (MCB) acting as a coupling frame (CF).

FIG. 4B above is a diagram (plan view) of a smartcard (SC) having a card body (CB) which may be a metal layer (ML) or a metal card body (MCB), with a slit (S) to function as a coupling frame (CF), and showing an inductive coupling chip module (ICM) having a module antenna (MA) and a coupling loop antenna (CLA), with the end portions (wire-ends) of the coupling loop antenna (CLA) directly connected to a patch antenna on a flexible circuit to pick up surface currents around the area of the slit or opening by means of inductive coupling.

The prior art describes how components can be connected across a slit to regulate the frequency with a capacitor (reference is made to FIG. 23 of U.S. Pat. No. 10,193,211) or some additional features may include: An LED may be connected across the slit (S) of a coupling frame (CF). However, the prior art is silent on the distribution of surface currents from one position in a metal layer to another position to amplify the overall collection of current to drive a component such as a transponder chip module (aka inductive coupling chip module).

FIG. 10 shows a coupling frame (CF) in the form of a card body (CB) which may be a metal layer (ML) or a metal card body (MCB) with a slit (S), and showing the elements of an inductive coupling chip module (ICM) having a module antenna (MA) and an RFID chip (IC). A coupling loop antenna (CLA) is also illustrated with the end portions (wire-ends) of the coupling loop antenna (CLA) ending in termination points (TPs) directly connected across a discontinuity in the form of a slit (S). The coupling loop antenna (CLA) is formed on the module tape (MT, CCT) with its windings placed close to the windings of the module antenna (MA). A capacitor may be connected in series or parallel to the coupling loop antenna (CLA).

CF coupling frame, which may be a metal card body (MCB)
    TCM transponder chip module
    CLA coupling loop antenna in the TCM
    MA module antenna in the TCM
    IC RFID chip in the TCM
    MO module opening (MO) in the card body (CB) for receiving the TCM
    S1 slit (S) extending from periphery of CB to MO
    S2 slit (S) extending from periphery of CB to an interior position (no MO)
    TP termination points for connecting the CLA to the CF FIG. 11 shows two coupling frames (CF) stacked one atop the other forming a card body (CB) and showing the elements of an inductive coupling chip module (ICM) having a module antenna (MA) and an RFID chip (IC). A coupling loop antenna (CLA), or coupling loop structure (CLS) which is not assembled on the module tape but rather which assembled on a flexible circuit (FC) inductively couples with the module antenna (MA). The end portions (wire-ends) of the coupling loop antenna (CLA) end in termination points (TPs) across the slit of one of the coupling frames in the stack.

In the case of a metal containing transaction card having a metal slug or a metal layer interfacing a non-conductive layer, it is possible to collect the surface currents from different positions on the conductive layer with or without slit. For example, the module antenna of the transponder chip module may overlap the interface between the conductive and non-conductive layer while the coupling loop antenna connected to a sense coil (SeC) or patch antenna (PA) may overlap a slit in the conductive layer.

In a different iteration of the above without a physical interconnection to termination points (TPs) across the slit (S), the coupling loop antenna (CLA) on a flexible circuit (FC) may be connected to a sense coil (SeC) which in turn inductively captures surface currents by overlapping the metal edge of the slit (S). The entire circuitry may be referred to as coupling loop structure (CLS).

A capacitor may be connected in parallel or series to the coupling loop antenna (CLA) or the coupling loop structure (CLS) to regulate the system frequency and or RF performance A component device such as an LED or sensor may be connected in parallel.

CF1 coupling frame (front)
    CF2 coupling frame (rear), insulated from CF1
    TCM transponder chip module
    MA module antenna in the TCM
    IC RFID chip in the TCM
    MO module openings in CF1 and CF2, for receiving TCM
    S1 slit (S) extending from periphery of CF1, CF2 to MOs in CF1, CF2
    S2 slit (S) extending from periphery of CF1, CF2 to an interior position (no MO)
    CLA coupling loop antenna (or coupling loop structure CLS)
    SeC sense coils (or patch antennae PA). one shown—over S1
    FC flexible circuit with one SeC
    TP termination points for connecting the CLA to CF1 or CF2

FIG. 12 shows two coupling frames (CF) stacked one atop the other with at least one slit (s) extending from a perimeter edge to a module opening (MO) or extending to an area without a module opening (MO) with the elements of a transponder chip module (TCM) highlighted, namely the module antenna (MA) and the RFID chip (IC), whereby surface currents are collected by at least one sense coil (SeC, two shown) or patch antennae (PA), and is directed to a coil which inductively couples with the module antenna (MA) of the transponder chip module (TCM). The circuitry of the coils on a flexible circuit (FC) may be referred to as a coupling loop structure (CLS). The flexible circuit may include a capacitor to regulate the resonance frequency and RF performance or power a component such as an LED or sensor.

The RFID-enabled metal containing transaction card may have a metal layer or a metal slug, separated by a dielectric, supported by an underlying metal layer with slit. In this configuration, the transponder chip module may overlap an interface between a conductive and non-conductive material on the front face of the card but collect surface current from the underlying metal layer with slit.

CF1 coupling frame (front)
    CF2 coupling frame (rear), insulated from CH
    MO module openings in CH and CF2, for receiving TCM S1 slit (S) extending from periphery of CF1, CF2 to MOs in CF1, CF2
S2 slit (S) extending from periphery of CF1, CF2 to an interior position (no MO)
TCM transponder chip module
MA module antenna in the TCM
IC RFID chip in the TCM
CLS coupling loop structure
SeC sense coils (or patch antennae (PA)). Two shown—one over S1, other over S2
FC flexible circuit with two SeC
There are no termination points (TP) in this embodiment FIG. 13 is a variation of FIG. 12 in which a metal slug (MS) is disposed on top of a metal layer (ML) having a slit (S) and functioning as a coupling frame (CF). The antenna circuitry remains the same, in using a coupling loop structure (CLS) to redirect surface currents.

CF coupling frame
MS metal slug (shown in outline)
TCM transponder chip module
MA module antenna in the TCM
IC RFID chip in the TCM
MO module openings in CF for receiving TCM
S1 slit (S) extending from periphery of CF to MO
S2 slit (S) extending from periphery of CF to an interior position (no MO)
CLS coupling loop structure
SeC sense coils (or patch antennae (PA)). Two shown—one over S1, other over S2
FC flexible circuit with two SeC
There are no termination points (TP) in this embodiment Further variations in the circuitry of an RFID-enabled metal transaction card include a coupling loop antenna (CLA) physically connected to a module antenna (MA), altering the physical length of the slit, and mix and matching currents from different coupling frames.

This disclosure further relates to dual interface metal transaction cards comprising two metal layers with at least one slit in each metal layer separated by an adhesively coated dielectric and laminated to synthetic layers to form a metal face transaction card with the objective that the drop acoustics of the metal transaction card sound like metal and not plastic. Retention of the metal sound requires careful selection of the adhesive system and the dielectric (carrier); the thickness of the adhesive layers and the carrier; the melt temperature of the adhesive; the crosslinking processing stage of the adhesive; the choice of each metal layer and their thickness; the choice and thickness of the synthetic layers and the lamination cycle or cycles and its or their respective lamination parameters (pressure, temperature and dwell time). The choice of the adhesive system and the carrier also impacts the ageing of the milling tools used to reduce an inlay of a given format to individual card bodies, in chamfering the card body edges at an angle, and forming a pocket in each card body for later insertion of a dual interface chip module.

Metallic Acoustic Sound of a Metal Face or Hybrid Transaction Card

It is an object of the current invention that the metal card body retains its metallic acoustic sound when tossed on a hard surface, by careful selection of the adhesive system and dielectric between metal layers, the type of metal used in the card construction, and any panel or insert for fitting into the metal card body. A metal card with a dielectric or an adhesive layer between metal layers renders the drop acoustics of the card to sound like plastic rather than metal, because of the dampening effect of the insulating medium between the metal layers.

Different metal layers may be used in the card construction, such as the combination of different metals such as titanium and stainless steel. Other metals, such as brass may also be chosen.

The dielectric carrier layer may be constructed from a 25 μm Polyethylene Naphthalate (PEN) film coated on both sides with a 25 μm coating of an epoxy based thermosetting adhesive system.

The adhesive system plays an important role in maintaining the drop acoustics of the metal card. A hard setting epoxy on a dielectric carrier layer such as PEN, PET or PC has the advantage that after laminating the metal layers (e.g. 25-up format) together, the epoxy does not re-melt and become tacky from the heat generation caused by the CNC milling (singulation process) in reducing the 25-up laminated metal inlay to individual card bodies.

The stack-up construction of a "Metal Face" transaction card having a front metal surface with a flat and solid color may have the following dimensions as set out below, and to maintain the metal sound integrity the traditional dielectric of a PET film is replaced by a PEN film with a front and rear adhesive coating, in addition two different metal substrates may be used, namely Titanium and Stainless Steel.

The metal cards can be digitally printed using UV inks and protected by a UV hard coat as proposed below. Or the metal layer can be screen printed with a primer and ink, protected by a lacquer, enamel or resin, and baked at elevated temperature. The protective resin may be laser engravable.

A logo of a payment scheme and or an issuing bank may be mechanically engraved into the ink-baked metal layer having a flat color, and in a subsequent production process, a UV hard coat layer (aka diamond coat) on a release layer may be laminated to the mechanically engraved metal layer to protect its surface. The UV hard coat may be laser engravable.

The hard coat layer is characterized by significant UV absorption. The clear or colored UV hard coat layer may also be sprayed on, mist-coated, or screen printed to the metal surface.

The slit in each metal layer can be filled with a UV curing epoxy or a two-component adhesive, dispensed as a microfluidic droplet for in situ bonding of the slit under pressure and vacuum control.

FIG. 14 shows a "Metal Face" transaction card showing a stacking of layers for a transaction card construction. Several layers in the stackup of the card are shown, and labeled. Two metal layers are separated by a double-sided adhesively coated dielectric carrier layer (PET or PEN layer, with adhesive on both sides). An inductive coupling chip module (ICM, or TCM) for inserting in openings (module opening) in the layers of the transaction card is shown.

To maintain the metal sound of a metal containing transaction card with two metal layers adhesively attached to each other, a PEN carrier may be used with a special adhesive system.

For example, a medium may be constructed from 25 μm Polyethylene Naphthalate (PEN) film coated on both sides with a 25 μm coating of an epoxy based adhesive system which is thermosetting. The adhesive coating is flexible, non-tacky and of low friction.

The stack-up construction of the card body may comprise of the following layers:

| | |
|---|---|
| UV HARD COAT | UV Hard Coat with low activation temperature on a Release Carrier Layer, the thickness of the UV Diamond Coat is 2-3 µm |
| ARTWORK | Printed on the front face metal layer (6 mils) of the metal inlay The artwork on the front face metal layer comprising Ink: ~15 µm, digitally printed flexible ink and Primer: ~10 µm, digitally printed primer |
| METAL INLAY | 2 Metal Layers of 6 mils (Printed Metal Layer) and 10 mils, each metal layer having a slit with a specific design, with the metal layers separated by a 75 µm adhesively coated PEN dielectric) ~485 µm One layer of Metal is Stainless Steel, while the other layer may be Titanium The "P1" opening in the top metal layer is for receiving the module tape (and contact pads) portion of an Inductive Coupling Chip Module (ICM) or Transponder Chip Module (TCM). The "P2" opening in the bottom metal layer is for receiving the mold mass portion of the Inductive Coupling Chip Module (ICM) or Transponder Chip Module (TCM). The "P1" opening is typically larger (in area) than the "P2" portion. |
| ADHESIVE | Adhesive layer ~25 µm |
| CLEAR PVC | Transparent PVC, digitally or lithographically printed ~150 µm |
| PRINTED INFO | Ink: ~15 µm Primer: ~10 µm |
| OVERLAY with MAGNETIC STRIPE | Overlay with magnetic stripe: 65 µm |
| ELEMENTS (not shown) | Signature panel and hologram Total thickness: 30.6 mils (778 µm) Pre-lamination |

FIG. 15 is a cross-sectional diagram (not to scale) of a metal transaction card. Several layers in the stackup of the card are shown, and labeled. A distinguishing feature of FIG. 15 over FIG. 14 is the substitution of the digital printed metal layer with a baked-on ink metal layer protected by a laser reactive layer of resin (a polyurethane polyester blend or an acrylic coating). Therefore, the UV hard coat layer is laminated to the laser reactive layer which protects the underlying clear print layer (gloss or matte finish). The clear print layer is bonded to the metal core with a primer (adhesive layer). The ink and primer are applied at an elevated temperature. The metal core is a single layer of metal or multiple layers of metal. The metal core is bonded to the rear clear print layer (printed transparent layer) with a thermosetting epoxy. Laminated thereto is a laser reactive layer with a magnetic stripe. The rear transparent printed layer matches the color of the baked-on ink layer. The adhesive system bonding the metal layers together to form a metal core or bonding the metal core to a synthetic layer such as the rear printed layer is epoxy.

FIG. 16 shows a "Metal Face" transaction card showing a stacking of layers for a transaction card construction. Several layers in the stackup of the card are shown, and labeled. The two metal layers are separated by a double-sided adhesively coated dielectric carrier layer. An inductive coupling chip module for inserting in openings (module opening) in the layers of the transaction card is shown.

FIG. 17 shows a "Metal Face" transaction card showing a stacking of layers for a transaction card construction. Several layers in the stackup of the card are shown, and labeled. The two metal layers are separated by three layers, comprising a first thermosetting adhesive layer, a dielectric layer, and a second thermosetting adhesive layer. An inductive coupling chip module for inserting in openings (module opening) in the layers of the transaction card is shown.

The metal layers may be pre-laminated together with the first thermosetting adhesive layer, the dielectric carrier layer as an insulation separation layer, and the second thermosetting adhesive layer.

The adhesive structure on both sides of the PEN carrier may be delivered after the B-stage process, and the adhesive layers may be reactivated in the lamination press process to achieve a non-reversible C-stage in which the adhesive does not melt, flow or become sticky.

A laminate as illustrated in FIG. 16 may be constructed from 25 µm Polyethylene Naphthalate (PEN) coated on both sides with a 25 µm coating of an epoxy based adhesive system, with a press lamination temperature of 170° C. for 30 minutes at a pressure of 10.5 kg/cm$^2$ (150 psi). As the operating temperature of the laminate is higher than the permissible processing temperature of the synthetic layers (e.g. PVC), the metal layers may be prelaminated first, before final lamination with the synthetic layers.

It is also feasible to use laminates based on 25 µm (1 mil) Polyethylene Naphthalate (PEN) film coated with low flow modified epoxy polyester adhesive, double sided, with a melt point of 105° C.±1° C. The shelf life of the laminate is typically 6 months, however, the adhesive will continue to cure at ambient temperature and raise the melt point as it continues to cross link. This can be slowed (or basically stopped) by storing in a freezer.

The thickness of the epoxy layer(s) and the thickness of the carrier layer play an important role in maintaining the metallic sound of a metal containing transaction card. The melt temperature of the thermosetting epoxy should match the glass transition temperature of the synthetic layers which are laminated to the metal layer or layers.

In summary, to maintain the metal sound of a metal containing transaction card with two metal layers adhesively attached to each other, a dielectric carrier layer may be used with a special thermosetting adhesive system.

The thermosetting resin and the choice of dielectric have an impact on the drop acoustics of a metal transaction card and on the life of the milling tools used to produce metal card bodies.

Before laminating metal layers in a card stack-up construction using an adhesive system (double-sided coated dielectric film) to bond the metal layers together, the adhesive system comprises of an uncured thermosetting epoxy resin in which the material softens when heated in the lamination press. The adhesive system before the lamination process is in an intermediate stage (B-stage) in the reaction of the thermosetting epoxy resin. After lamination, the characteristics of the final cured resin in the C-stage exhibits high thermal properties and does not soften under the influence of heat during the CNC milling process.

The dielectric layer may be constructed from a 25 μm Polyethylene Naphthalate (PEN) film coated on both sides with a 25 μm coating of an epoxy based thermosetting adhesive system.

The dielectric may also be made from a fiber (e.g. glass or carbon) or any suitable composite material.

Different metal layers with different acoustic properties may be used in the card construction, such as the combination of titanium and stainless steel.

Some Additional Comments

Regarding FIGS. 3A/B, 4A/B, 5, 6A/B

These figures have described some constructions and features of transponder chip modules (TCM) comprising a module tape (MT), an RFID chip (IC) and a module antenna (MA) on one side of the module tape, and (optionally) contact pads (CP) on the other side of the module tape, and how the resulting module may interact with a coupling frame (CF), which may be a metal card body (MCB) with a slit (S), of a smartcard (SC). More specifically, a coupling loop antenna (CLA) may be integrated into the module (TCM) along with the module antenna, and may be disposed on the same or on an opposite side of the module tape as the module antenna.

the coupling loop antenna may be inductively coupled with the module antenna, and the coupling loop antenna may further be inductively coupled, via a patch antenna (PA) on a flexible circuit (FC) to the coupling frame.

the coupling loop antenna may be inductively coupled with the module antenna, and the coupling loop antenna may further be galvanically (physically) connected with the coupling frame.

FIG. 3AB show some variations of incorporating the coupling loop antenna with a module antenna in the module FIG. 4A shows connecting to termination points (TP) on the coupling frame.

FIG. 4B shows the addition of a patch antenna (PA) on a flexible circuit (FC), for interacting (harvesting energy) slit(s) in the coupling frame. (Note in FIG. 4B, the module is shown "schematically" to be displaced from its required position on the card, to illustrate that the position of the slit is independent of the position of the module.)

the addition of the coupling loop antenna (and, optionally, the patch antenna) completely eliminates the need for the module antenna to overlap the slit in the coupling frame, thereby opening a multitude of opportunities for where the slit, or multiple slits, may be located in the coupling frame. (Overlapping of the slit and the module antenna is considered de rigueur in prior art coupling frame patents, such as U.S. Pat. Nos. 9,475,086 and 9,798,968.)

FIG. 5 shows a metal element with a slit (i.e. a coupling frame) located at a central position on the card body, for aesthetic purposes, and also so that the "center of technology"—the position on the card where RF communication is most effective (with an external reader or POS terminal)—can be located at a more desirable location, such as the center of the card body. See also FIGS. 6A/B.

one might propose connecting the chip directly to the coupling frame, thereby eliminating the need for the module antenna and the coupling loop antenna, but this would entail its own complications, additional components, and reliability issues.

US 20160110639 discloses, at FIG. 2D, a transponder chip module (TCM) having a secondary coupling frame (SCF) and connecting with an external coupling frame (CF, not shown). [0094]

[0192] FIG. 2D shows a transponder chip module (TCM) 210 having an RFID chip (IC) and a module antenna (MA) 212. Additionally, the transponder chip module has a coupling frame 222 (compare FIG. 2C) which has a slit (S) 230, and which may be referred to as a "secondary" coupling frame (SCF). The tolerances of the secondary coupling frame can be closely controlled during the manufacture of the transponder chip module. The secondary coupling frame may be considered to be an "integrated coupling frame". The transponder chip module may be considered to be a capacitive coupling enhanced (CCE) transponder chip module (TCM) Also shown is that the secondary coupling frame may be electrically connected with an external coupling frame (CF). This concept may be applied to transponder chip module inserts which are inserted into payment objects, as disclosed herein.

The use of a coupling loop antenna is different than the secondary coupling frame approach set forth in US 20160110639. The purpose of the secondary coupling frame is to allow the transponder chip module to operate independently of the card coupling frame, such as in a wearable device, and suggests that the secondary coupling frame with a larger area than the module antenna could pick up additional currents to drive the module antenna. '639 mentions that the secondary coupling frame may be electrically connected with an external coupling frame (CF). [0192]

Regarding FIGS. 7, 8, 9

These figures illustrate some interesting alternate constructions for smartcards (SC) having a metal layer (ML) or a metal card body (MCB) with a slit (S) to function as a coupling frame (CF). Generally, rather than the metal spanning the entire area of the card, a portion of the card body may be metallic, and a remaining portion of the card body may be a non-metallic material, such as ceramic, wood, plastic, etc. (including transparent), said non-metallic material generally being selected for its aesthetic appeal (rather than any technical capability). Because the slit in the metal portion of the card body may be located anywhere (referencing the teachings of FIGS. 3A/B, 4A/B, 5, 6A/B)—i.e., in the middle of the card body (FIGS. 6A/B), in a top or bottom portion of the card body (FIGS. 7,8), or in a left-hand or right-hand portion of the card body (FIG. 9).

Note that these figures are not "breakaway" views, wherein a portion of one layer is missing to reveal a corresponding portion of an underlying layer. They indeed show two, complete adjacent (e.g., side-by-side) portions of a card body.

FIG. 7 shows a standard module in a standard position in a card body, and there is no slit in the metal portion of the card body. Rather, the module antenna of the module may overlap an edge (metal edge) of the metal portion of the card body wherein there are eddy currents for effecting coupling (and energy harvesting).

Metal Edge & Metal Ledge

For optimum RF performance, the dimensional width of the windings (or width across multiple windings) of a sense coil (SeC), patch antenna (PA) or a pick-up coil (PuC) ought to overlap a metal edge (ME) of a slit, gap or notch in the card body by 50% of the distance across the windings to capture the surface currents at the metal edge (or ledge).

A sense coil (SeC), patch antenna (PA) or a pick-up coil (PuC) (all or which may be referred to as "antennas", or antenna structures AS) may comprise multiple windings (or tracks), and may have a width. For optimum performance, the antenna should overlap a metal edge (ME).

The same principle of overlap may apply to the module antenna (MA) of a transponder chip module (TCM) implanted in a metal containing transaction card. The dimensional width of the windings of the module antenna (MA) ought to overlap a metal ledge (P1) of a stepped cavity forming the module pocket in a card body by 50% of the distance across the windings of the module antenna.

FIG. 8 shows a slit in the metal portion of the card body, and the slit can be located remotely from the module antenna of the transponder chip module, in the manner disclosed, for example, in FIG. 4B. As disclosed herein, by using a flexible circuit (FC) with patch antennae (PA), energy (voltage, resulting current) can be "transported" from any portion of the card body where there is a slit or a metal edge, to a module having a standard module antenna, or to a module having an additional coupling loop antenna.

FIG. 9 shows a variation where there is an underlying antenna track 901 surrounding the transponder chip module 902.

The two portions of the card body—i.e., the metallic and the non-metallic portion—may be coplanar with one another, in which case they may both be supported by a common layer or layers of metallic or non-metallic material which cover(s) the entire area of the card. For example, in a conventional, well known, prior art manner, a rear plastic subassembly may be joined with an adhesive layer, to a rear side of the metal layer or metal card body. The rear plastic subassembly may comprise a rear printed layer and a rear overlay layer.

Alternatively, one or the other of the two portions of the card body—i.e., the metallic and the non-metallic portion—may extend over substantially the entire area of the card, and may be provided with a recess or pocket to receive the other portion, resulting in a front surface of the two portions being coplanar. Such an arrangement may be disclosed in US 20160110639, which shows the following, at FIGS. 3C/D.

[0097] FIG. 3C is a plan view of a hybrid metal smart card, which may be a credit card.

[0098] FIG. 3D is a perspective view (exploded) of a hybrid ceramic and metal smart card.

[0225] FIG. 3C illustrates a design of a hybrid metal credit card (or smart card) 300. The card body (CB) 302 is largely composed of metal (and may be referred to as a metal card body MCB), this may be a precious or high density metal such as silver, titanium, tungsten or a high strength metal such as stainless steel, and may comprise a non-precious metal plated with a precious metal. The card body (CB) features a slit (S, dashed lines) 330 extending from an edge of the card body (CB) through the position of the transponder chip module (TCM) 310 so that the slit overlaps the module antenna thereof and the card body (CB) functions as a coupling frame (CF) 320. The metal card body (CB, MCB) may have one or more recesses 342, 344 in the front and/or rear face of the card. These recesses may be filled with implanted or laminated non-conductive filler materials such as ceramic, plastic, glass, wood etc. The filled recesses may be, for example, 50% of the depth of the card thickness. These filled recesses serve as decorative elements on the card. In particular at the module position they serve to conceal the slit (S) in the card and allow a neat implanting of the module into the card body. In addition, the use of a recess filled with non-conductive material surrounding the transponder chip module may mitigate the effects of electrostatic discharge (ESD) when inserting the card into payment terminals or ATM machines, as the fill material for the recess may have a high dielectric constant and hence protect the transponder chip module from static discharges.

[0226] FIG. 3D illustrates a design of a hybrid ceramic and metal smart card (SC) 300. The card body (CB) 302 may be made of solid metal and feature a slit (S) 330 at the position of the transponder chip module (TCM) 310. The card body with slit may function as a coupling frame (CF) 320, with the slit overlapping the module antenna of the transponder chip module. The metal card body may feature a recess that may cover most of the size of the card and extend around the slit position to the periphery of the card. This recess may be filled by gluing or laminating a moulded or cut ceramic insert 304. This allows the card to retain the mechanical strength of the metal (e.g. stainless steel, titanium, tungsten) and have the aesthetic appearance and appeal of a polished ceramic finish.

In the examples illustrated in FIGS. 7,8,9, the metallic and non-metallic portions each are shown occupying approximately 50% of the area of the front, visible surface of the card (i.e., the surface area of the card). Other "ratios" of metallic to non-metallic portions are, of course, possible. For example, the metallic (conductive) portion (510, 610, 710, 810, 910) of the card may comprise at least 25% of the surface area of the card, with the non-metallic (plastic, synthetic, non-conductive, translucent or transparent) portion (520,620,720,820,920), comprising the remaining 75%. This may be contrasted with a conventional plastic card having metallic contact pads (CP) that account for a very small fraction (less than 10%) of the surface area of the card. According to the invention, the metallic portion of the metallic/non-metallic cards described herein may comprise at least 25%, at least 30%, or at least 50%, up to 80% or 90% of the overall surface area of the card, the remaining portion of the surface area comprising the non-metallic portion.

In some embodiments, the metallic portion has a slit (S; 518, 618, 818, 918) to enable the metallic portion to function as a coupling frame (CF). In other embodiments, an interface (718) performs the function of the slit, in that a module antenna (MA) or patch antenna (PA) overlying the slit or interface can harvest energy from eddy currents present at the slit or interface with the card is in an interrogation field (such as from a POS terminal).

Regarding FIGS. 10, 11, 12, 13

These figures show some particulars of arrangements for moving current around the card body from a location where it is harvested (typically at a slit, or at a metal edge), to a location where it is needed, using a flexible circuit (FC), coupling loop antenna (CLA), patch antennae (PA), termination points (TP), etc, as may have been discussed above. These figures also show that a capacitor or other component may be integrated into the card, such as on the flexible circuit, to improve or fine-tune the performance of the card.

The concept of wirelessly connecting two physically separated modules on a card, such as for enabling communication between the two modules, has been disclosed in US 2020/0034578 (Jan. 30, 2020; Finn et al.) which discloses SMARTCARD WITH DISPLAY AND ENERGY HARVESTING. A wireless connection may be established between two electronic modules (M1, M2) disposed in module openings (MO-1, MO-2) of a smartcard so that the two modules may communicate (signals, data) with each other. The connection may be implemented by a booster antenna (BA) having two coupler coils (CC-1, CC-2) disposed close to the two modules, and connected with one another. The booster antenna may also harvest energy from an external device such as a card reader, POS terminal, or a smartphone. A coupling antenna (CPA) may have only the two coupler coils connected with one another, without the peripheral card antenna (CA) component of a conventional booster antenna. A module may be disposed in only one of the two module openings. As disclosed therein:

FIG. 2 is a block diagram of a smartcard having a display, according to an embodiment of the invention. [0093]

FIG. 3 is a diagram of a booster antenna having two coupler coils, according to an embodiment of the invention.

FIG. 4A is a diagram of a smartcard having a coupling frame with two openings, for respective two modules.

FIG. 4B is a diagram of a smartcard having two coupling frames, each with an opening for a module.

FIG. 4C is a diagram of a smartcard having a coupling frame with two openings, one (or both) of which may be populated with a module. [0097]

FIG. 2 shows a smartcard (SC) comprising a chip module (CM, or M1) and booster antenna (BA), comparable to those shown in FIG. 1.

The smartcard (SC) further comprises a display module (DM, or M2) disposed in the card body (CB), and having a surface which may be substantially coincident with the front or rear surface of the card body (CB), for displaying information, such as a card verification value (CVV), to the card-holder (user). [0113]

The display module (DM, M2) is physically separate (spaced-apart) and distinct from the chip module (CM, M1) and is not connected by wires to the chip module (CM). The display module (DM, M2) is disposed in a different area of the card body than the chip module (CM, or M1). [0114]

FIG. 4C shows a metal layer (ML) with two module openings (MO-1, MO-2) and respective two slits (S1, S2). Compare FIG. 4A. [0159]

FIG. 4C additionally shows a coupling antenna (CPA) which may similar to the booster antenna (BA) shown in FIG. 3, but without the peripheral card antenna (CA) component. In other words, the coupling antenna (CPA) is shown having two coupler coils (CC-1) and (CC-2) overlapping, within or in close proximity to respective two module openings (MO-1, MO-2) of the card body (CB) and coupling frame (CF). The two coupler coils (CC-1, CC-2) may both have free ends (●). Alternatively, the ends of the two coupler coils could be connected with one another, as illustrated by the dashed line. [0160]

[0072] It is a general object of the invention to eliminate the hardwired connection between distinct electronic circuits (or modules) within the smartcard, and effect the connection with a wireless connection between the modules. The wireless connection may convey power and/or data between the modules. The wireless connection may be applicable to two or more modules.

[0073] When there are two distinct circuits (or separate modules) that need to communicate with one another, this may involve, at a minimum, passing signals (including data) between the two modules, both of which need to be powered.

[0165] The second module opening (MO-2) and its slit (S2) may be located at a different position on the card, such as along a top or bottom edge thereof. The module opening (MO-2) may be omitted, leaving just the slit (S2). The coupling antenna (CPA) may traverse the slits (S1, S2). A portion of the coupling antenna (CPA), more particularly of the coupling coils (CC-1, CC-2) may be disposed adjacent (such as parallel) to the slits (S1, S2).

Regarding FIGS. 14, 15, 16, 17

These figures illustrate various stackup of cards, with particular attention to selection of adhesives. Currently, the industry uses thermoplastic adhesives, which re-melt after they are hardened, and in processes requiring multiple lamination steps, this can present a challenge. Refer, for example, to US 20180339503 which discloses, for example, in a first laminating step, a subassembly of two metal layers and a dielectric layer is laminated at a first temperature; and in a second laminating step, the front and back overlays are laminated to the subassembly at the same or at a higher temperature than the first laminating step.

See also U.S. Pat. No. 8,672,232 (2014 Mar. 18; Herslow) which discloses combination card of metal and plastic, wherein a card includes a first assembly comprised of multiple plastic layers attached via an adhesive to a metal layer. The multiple plastic layers forming the first assembly are laminated under a first selected temperature and pressure conditions to preshrink the multiple plastic layers, stress relieve the first assembly and render the first assembly dimensionally stable. The laminated first assembly is then attached to a metal layer via an adhesive layer to form a second assembly which is then laminated at a temperature below the first selected temperature to form a card which is not subjected to warpage and delamination.

As disclosed herein a thermosetting epoxy adhesive may be purchased and applied in its B-stage ("uncured"), then laminated (at appropriate press, temp) to become C-stage ("cured"), whereupon it is not subject to being re-melted (at conventional laminating temperatures). This is in stark contrast to polyurethane or polyester adhesives. Re-melting is a problem, because it may not only make a mess, but it may also be damaging to a milling tool.

The adhesive, thermosetting epoxy (hot-cured resin, highly-crosslinked) has a morphology (microstructure) which consists of a continuous phase, and which does not dampen the acoustics of the metal sound.

Some Additional Disclosure

CNC Milling

Typically, cards may be manufactured (laid up and laminated) in sheet form, each sheet having a plurality of cards, such as in a 5×5 array, and CNC (computer numerical control) machining may be used to singulate (separate) the finished cards from the sheet. Resulting burrs, particularly in the metal layers, may cause defects, such as electrical shorting of the slit. Hence, CNC machining of metal core, metal face or solid metal smartcards may be performed using cryogenic milling, such as in an environment of frozen carbon dioxide or liquid nitrogen.

Some Additional Comments

Some of the card embodiments disclosed herein may have two metal layers, separated by a dielectric coating or an insulating layer, rather than a single metal layer. The two metal layers may comprise different materials and may have different thicknesses than one another. For example, one of the metal layer may be stainless steel while the other metal layer may be titanium. In this manner, the "drop acoustics" of the metal card body may be improved, in that the card, when dropped or tapped (edgewise) on a hard surface, sounds like a solid metal card (making a ringing or tinkling sound), rather than like a plastic card (making a "thud").

Generally, in order for the smartcard to be "RFID-enabled" (able to interact "contactlessly"), each of the one or more metal layers should have a slit, or micro-slit. When there are two (or more) metal layers with slits in the stack-up, the slits in the metal layers should be offset from one another.

Some Generic Characteristics

The smartcards described herein may have the following generic characteristics:
- The card body may have dimensions similar to those of a credit card. ID-1 of the ISO/IEC 7810 standard defines cards as generally rectangular, measuring nominally 85.60 by 53.98 millimeters (3.37 in×2.13 in).
- A chip module (RFID, contact type, or dual interface) may be implanted in a recess (cavity, opening) in the card body. The recess may be a stepped recess having a first (upper, P1 portion) having a cavity depth of 250 μm, and a second (lower, P2 portion) having a cavity depth of (maximum) 600 μm.
- A contact-only or dual interface chip module will have contact pads exposed at a front surface of the card body.
- ISO 7816 specifies minimum and maximum thickness dimensions of a card body:
    Min 0.68 mm (680 μm) to Max 0.84 mm (840 μm) or
    Min 0.027 inch to Max 0.033 inch Generally, any dimensions set forth herein are approximate, and materials set forth herein are intended to be exemplary. Conventional abbreviations such as "cm" for centimeter", "mm" for millimeter, "μm" for micron, and "nm" for nanometer may be used.

The concept of modifying a metal element of an RFID-enabled device such as a smartcard to have a slit (S) to function as a coupling frame (CF) may be applied to other products which may have an antenna module (AM) or transponder chip module (TCM) integrated therewith, such as watches, wearable devices, and the like.

Some of the features of some of the embodiments of RFID-enabled smartcards may be applicable to other RFID-enabled devices, such as smartcards having a different form factor (e.g., size), ID-000 ("mini-SIM" format of subscriber identity modules), keyfobs, payment objects, and non-secure NFC/RFID devices in any form factor.

The RFID-enabled cards (and other devices) disclosed herein may be passive devices, not having a battery and harvesting power from an external contactless reader (ISO 14443). However, some of the teachings presented herein may find applicability with cards having self-contained power sources, such as small batteries (lithium-ion batteries with high areal capacity electrodes) or supercapacitors.

The transponder chip modules (TCM) disclosed herein may be contactless only, or dual-interface (contact and contactless) modules.

In their various embodiments, the invention(s) described herein may relate to payment smartcards (metal, plastic or a combination thereof), electronic credentials, identity cards, loyalty cards, access control cards, and the like.

While the invention(s) may have been described with respect to a limited number of embodiments, these should not be construed as limitations on the scope of the invention(s), but rather as examples of some of the embodiments of the invention(s). Those skilled in the art may envision other possible variations, modifications, and implementations that are also within the scope of the invention(s), and claims, based on the disclosure(s) set forth herein.

The invention claimed is:

1. A smartcard comprising a card body including two or more metal layers, wherein each metal layer includes two slits, and a flex circuit with two interconnected sense coils, wherein the sense coils overlap one of the slits in each metal layer.

* * * * *